US012267339B1

(12) United States Patent

Shahbaz et al.

(10) Patent No.: US 12,267,339 B1

(45) **Date of Patent: *Apr. 1, 2025**

(54) EXECUTING MODULAR ALERTS AND ASSOCIATED SECURITY ACTIONS

(71) Applicant: Splunk Inc., San Francisco, CA (US)

(72) Inventors: Banipal Shahbaz, Santa Clara, CA (US); Sri Atma Oaklander de Licori, San Francisco, CA (US); John Robert Coates, San Francisco, CA (US); David Hazekamp, Tinley Park, IL (US); Devendra Badhani, Santa Clara, CA (US); Luke Murphey, Wadsworth, IL (US); Patrick Schulz, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,624

(22) Filed: Apr. 28, 2023

Related U.S. Application Data

(63) Continuation of application No. 16/944,433, filed on Jul. 31, 2020, now Pat. No. 11,677,760, which is a (Continued)

(51) Int. Cl.

*G06F 21/55* (2013.01)

*G06F 21/53* (2013.01)

(Continued)

(52) U.S. Cl.

CPC .......... *H04L 63/1416* (2013.01); *G06F 21/53* (2013.01); *G06F 21/554* (2013.01);

(Continued)

(58) Field of Classification Search

CPC ............... H04L 63/1416; H04L 63/145; H04L 63/1458; H04L 63/1475; H04L 2463/121;

(Continued)

(56) References Cited

U.S. PATENT DOCUMENTS 4,445,177 A * 4/1984 Bratt ......................... G06F 8/41 712/245

5,787,253 A 7/1998 McCreery et al.

(Continued)

FOREIGN PATENT DOCUMENTS

CN 105302727 A * 2/2016

OTHER PUBLICATIONS

"API of a package in python. In _init_.py?", 2010, obtained online from <https://stackoverflow.com/questions/3271794/api-of-a-package-in-python-in-init-py>, retrieved on Dec. 16, 2023 (Year: 2010).*

(Continued)

*Primary Examiner* — Zhimei Zhu

(74) *Attorney, Agent, or Firm* — Shook, Hardy & Bacon L.L.P.

(57) ABSTRACT

Techniques and mechanisms are disclosed for configuring actions to be performed by a network security application in response to the detection of potential security incidents, and for causing a network security application to report on the performance of those actions. For example, users may use such a network security application to configure one or more "modular alerts." As used herein, a modular alert generally represents a component of a network security application which enables users to specify security modular alert actions to be performed in response to the detection of defined triggering conditions, and which further enables tracking information related to the performance of modular alert actions and reporting on the performance of those actions.

15 Claims, 39 Drawing Sheets

Related U.S. Application Data continuation of application No. 15/276,756, filed on Sep. 26, 2016, now Pat. No. 10,771,479.

(51) Int. Cl.
*H04L 9/40* (2022.01)
*G06F 16/248* (2019.01)
*G06F 16/26* (2019.01)

(52) U.S. Cl.
CPC ........ *H04L 63/145* (2013.01); *H04L 63/1458* (2013.01); *H04L 63/1475* (2013.01); *G06F 16/248* (2019.01); *G06F 16/26* (2019.01); *G06F 2221/2151* (2013.01); *H04L 2463/121* (2013.01); *H04L 2463/141* (2013.01)

(58) Field of Classification Search
CPC . H04L 2463/141; G06F 21/53; G06F 21/554; G06F 16/248; G06F 16/26; G06F 2221/2151; G06F 11/3664; G06F 11/3604; G06F 11/3672; G06F 11/3688; G06F 11/3692; G06F 11/3696
See application file for complete search history.

(56) References Cited

U.S. PATENT DOCUMENTS 5,796,942 A 8/1998 Esbensen
6,044,401 A 3/2000 Harvey
6,418,471 B1 7/2002 Shelton et al.
6,587,969 B1 7/2003 Weinberg et al.
6,792,460 B2 9/2004 Oulu et al.
6,810,494 B2 10/2004 Weinberg et al.
6,892,167 B2 5/2005 Polan et al.
6,898,556 B2 5/2005 Smocha et al.
6,915,308 B1 7/2005 Evans et al.
6,973,489 B1 12/2005 Levy
6,985,944 B2 1/2006 Aggarwal
7,177,441 B2 2/2007 Condon et al.
7,197,559 B2 3/2007 Goldstein et al.
7,219,138 B2 5/2007 Straut et al.
7,246,101 B2 7/2007 Fu et al.
7,257,719 B2 8/2007 Pandit et al.
7,260,846 B2 8/2007 Day
7,277,957 B2 10/2007 Rowley et al.
7,293,238 B1 11/2007 Brook et al.
7,376,896 B2 5/2008 Ullmann et al.
7,380,272 B2 5/2008 Sharp et al.
7,444,263 B2 10/2008 White et al.
7,543,051 B2 6/2009 Greifeneder et al.
7,577,623 B2 8/2009 Genty et al.
7,594,011 B2 9/2009 Chandra
7,594,269 B2 9/2009 Durham et al.
7,607,170 B2 10/2009 Chesla
7,610,344 B2 10/2009 Mehr et al.
7,623,463 B2 11/2009 Chavda
7,702,806 B2 4/2010 Gil et al.
7,729,240 B1 6/2010 Crane et al.
7,738,396 B1 6/2010 Turner et al.
7,751,393 B2 7/2010 Chaskar et al.
7,761,918 B2 7/2010 Gula et al.
7,797,443 B1 9/2010 Pettigrew et al.
RE41,903 E 10/2010 Wenig et al.
7,836,498 B2 11/2010 Poletto et al.
7,869,352 B1 1/2011 Turner et al.
7,948,889 B2 5/2011 Lalonde et al.
7,962,616 B2 6/2011 Kupferman et al.
7,979,555 B2 7/2011 Rothstein et al.
8,019,064 B2 9/2011 Bedingfield et al.
8,020,211 B2 9/2011 Keanini et al.
8,032,564 B2 10/2011 Muret et al.
8,037,175 B1 10/2011 Apte et al.
8,042,055 B2 10/2011 Wenig et al.
8,056,130 B1 11/2011 Njemanze et al.
8,064,350 B2 11/2011 Peterman et al.
8,068,986 B1 11/2011 Shahbazi et al.
8,095,640 B2 1/2012 Guingo et al.
8,103,765 B2 1/2012 Greifeneder et al.
8,125,908 B2 2/2012 Rothstein et al.
8,127,000 B2 2/2012 Wenig et al.
8,140,665 B2 3/2012 Malloy et al.
8,144,609 B2 3/2012 Rao
8,185,953 B2 5/2012 Rothstein et al.
8,191,136 B2 5/2012 Dudfield et al.
8,195,661 B2 6/2012 Kalavade
8,248,958 B1 8/2012 Tulasi et al.
8,255,511 B1 8/2012 Moore et al.
8,301,745 B1 10/2012 Wohlgemuth et al.
8,335,848 B2 12/2012 Wenig et al.
8,364,509 B1 1/2013 Marr
8,385,532 B1 2/2013 Geist et al.
8,386,371 B2 2/2013 Kittelsen et al.
8,386,598 B2 2/2013 Robinson
8,473,620 B2 6/2013 Demmer et al.
8,522,219 B2 8/2013 Schwarzbauer et al.
8,533,532 B2 9/2013 Wenig et al.
8,549,650 B2 10/2013 Hanson
8,583,772 B2 11/2013 Wenig et al.
8,589,375 B2 11/2013 Zhang et al.
8,806,361 B1 8/2014 Noel et al.
8,806,629 B1 8/2014 Cherepov et al.
8,918,430 B2 12/2014 Fischer
8,997,230 B1 3/2015 McCauley et al.
9,137,258 B2 9/2015 Haugsnes
9,715,675 B2 7/2017 Chakravarty et al.
2002/0015387 A1 2/2002 Houh
2003/0120619 A1 6/2003 Osborn
2003/0221000 A1 11/2003 Cherkasova et al.
2004/0030796 A1 2/2004 Cooper et al.
2004/0044912 A1 3/2004 Connary et al.
2004/0152444 A1 8/2004 Lialiamou et al.
2004/0193892 A1 9/2004 Tamura et al.
2004/0199361 A1 10/2004 Lu et al.
2005/0120160 A1 6/2005 Plouffe et al.
2005/0138013 A1 6/2005 Walker et al.
2005/0138426 A1 6/2005 Styslinger
2005/0273593 A1 12/2005 Seminaro et al.
2005/0278731 A1 12/2005 Cameron et al.
2006/0047721 A1 3/2006 Narang et al.
2006/0198318 A1 9/2006 Schondelmayer et al.
2006/0259967 A1 11/2006 Thomas et al.
2007/0033408 A1 2/2007 Morten
2007/0043861 A1 2/2007 Baron et al.
2007/0106692 A1 5/2007 Klein
2007/0150584 A1 6/2007 Srinivasan
2007/0156916 A1 7/2007 Schiefer
2007/0169194 A1 7/2007 Church et al.
2007/0208852 A1 9/2007 Wexler et al.
2008/0040191 A1* 2/2008 Chakravarty .......... G06Q 10/10 705/7.26
2008/0056139 A1 3/2008 Liaqat
2008/0229418 A1 9/2008 Chen et al.
2008/0244741 A1 10/2008 Gustafson et al.
2008/0281963 A1 11/2008 Fletcher et al.
2008/0301175 A1 12/2008 Applebaum et al.
2009/0129316 A1 5/2009 Ramanathan et al.
2009/0228474 A1 9/2009 Chiu et al.
2009/0238088 A1 9/2009 Tan
2009/0271504 A1 10/2009 Ginter et al.
2010/0031274 A1 2/2010 Sim-Tang
2010/0064307 A1 3/2010 Malhotra et al.
2010/0070929 A1 3/2010 Behl et al.
2010/0136943 A1 6/2010 Hirvela et al.
2010/0153316 A1 6/2010 Duffield et al.
2010/0318836 A1 12/2010 Ness et al.
2011/0106935 A1 5/2011 Srinivasan
2011/0166982 A1 7/2011 Cole et al.
2011/0231935 A1 9/2011 Gula et al.
2011/0238723 A1 9/2011 Weintraub et al.
2011/0296015 A1 12/2011 Chakravarty et al.
2011/0302305 A1 12/2011 Morimura et al.
2012/0017270 A1 1/2012 Bartholomay et al.
2012/0084437 A1 4/2012 Wenig et al.

(56) References Cited

U.S. PATENT DOCUMENTS

| | | | | |
|---|---|---|---|---|
| 2012/0089964 | A1* | 4/2012 | Sawano | G06F 11/3664 717/124 |
| 2012/0158987 | A1 | 6/2012 | Greifeneder et al. | |
| 2012/0173966 | A1 | 7/2012 | Powell et al. | |
| 2012/0198047 | A1 | 8/2012 | Steuer et al. | |
| 2012/0239681 | A1 | 9/2012 | Zhang et al. | |
| 2013/0024431 | A1 | 1/2013 | Parthasarathy et al. | |
| 2013/0067034 | A1 | 3/2013 | Degioanni et al. | |
| 2013/0070622 | A1 | 3/2013 | Degioanni et al. | |
| 2013/0080620 | A1 | 3/2013 | Cook | |
| 2013/0091278 | A1 | 4/2013 | Ludwig et al. | |
| 2013/0111011 | A1 | 5/2013 | Moulhaud et al. | |
| 2013/0114456 | A1 | 5/2013 | Dahod | |
| 2013/0128742 | A1 | 5/2013 | Yu | |
| 2013/0132833 | A1 | 5/2013 | White et al. | |
| 2013/0136253 | A1 | 5/2013 | Liberman et al. | |
| 2013/0173782 | A1 | 7/2013 | Ragutski et al. | |
| 2013/0198391 | A1 | 8/2013 | Weissblum | |
| 2013/0212689 | A1 | 8/2013 | Ben-Natan et al. | |
| 2013/0227689 | A1 | 8/2013 | Pietrowicz et al. | |
| 2013/0232137 | A1 | 9/2013 | Knott | |
| 2013/0246925 | A1 | 9/2013 | Ahuja et al. | |
| 2013/0258995 | A1 | 10/2013 | Skov et al. | |
| 2014/0230062 | A1 | 8/2014 | Kumaran | |
| 2014/0317684 | A1 | 10/2014 | Porras et al. | |
| 2015/0013006 | A1 | 1/2015 | Shulman et al. | |
| 2015/0033333 | A1 | 1/2015 | Merza | |
| 2015/0163234 | A1 | 6/2015 | Tal et al. | |
| 2015/0172300 | A1 | 6/2015 | Cochenour | |
| 2015/0180891 | A1 | 6/2015 | Seward et al. | |
| 2016/0028758 | A1 | 1/2016 | Ellis et al. | |
| 2016/0034361 | A1* | 2/2016 | Block | G06F 11/079 714/4.12 |
| 2016/0078236 | A1 | 3/2016 | Chesla | |
| 2016/0119405 | A1* | 4/2016 | Karpoor | G06Q 10/06 709/217 |
| 2016/0173446 | A1 | 6/2016 | Nantel | |
| 2016/0275190 | A1 | 9/2016 | Seed et al. | |
| 2017/0048260 | A1 | 2/2017 | Peddemors et al. | |
| 2017/0063920 | A1 | 3/2017 | Thomas et al. | |
| 2017/0223039 | A1 | 8/2017 | Mont et al. | |
| 2017/0230412 | A1 | 8/2017 | Thomas et al. | |
| 2017/0289178 | A1 | 10/2017 | Roundy et al. | |
| 2017/0339174 | A1 | 11/2017 | Mounaguruswamy | |
| 2018/0027006 | A1 | 1/2018 | Zimmermann et al. | |
| 2018/0034835 | A1 | 2/2018 | Iwanir et al. | |

OTHER PUBLICATIONS

Microsoft, the definition of script, Microsoft Computer Dictionary, Fifth Edition, p. 467 (Year: 2002).*

"Basic Incident Response Script for Linux", Jun. 19, 2016, obtained online from <https://github.com/puffyCid/linuxLiveResponse>, retrieved on Jun. 25, 2024 (Year: 2016).*

Advisory Action from U.S. Appl. No. 14/253,753, Apr. 29, 2016, 2 pages.

Advisory Action from U.S. Appl. No. 14/253,753, May 7, 2015, 2 pages.

Advisory Action from U.S. Appl. No. 14/253,767, Mar. 1, 2016, 3 pages.

Final Office Action from U.S. Appl. No. 14/253,713, Feb. 10, 2015, 15 pages.

Final Office Action from U.S. Appl. No. 14/253,713, Feb. 12, 2016, 17 pages.

Final Office Action from U.S. Appl. No. 14/253,744, Jan. 9, 2015, 29 pages.

Final Office Action from U.S. Appl. No. 14/253,744, Oct. 23, 2015, 51 pages.

Final Office Action from U.S. Appl. No. 14/253,753, Feb. 4, 2016, 17 pages.

Final Office Action from U.S. Appl. No. 14/253,753, Mar. 2, 2015, 19 pages.

Final Office Action from U.S. Appl. No. 14/253,767, Dec. 16, 2015, 21 pages.

Final Office Action from U.S. Appl. No. 14/253,767, Jan. 7, 2015, 14 pages.

Final Office Action from U.S. Appl. No. 14/528,898, Jun. 29, 2016, 18 pages.

Final Office Action received for U.S. Appl. No. 15/276,756, Feb. 21, 2019, 28 pages.

JD Lenaeus, "How to Implement Security Controls for an Information Security Program at CBRN Facilities", 2015, obtained online from <https://www.pnnl.gov/main/publications/external/technical_reports/PNNL-25112.pdf>, retrieved on Jul. 16, 2022 (Year: 2015).

Non-Final Office Acion, U.S. Appl. No. 16/944,433, Jul. 22, 2022, 27 pages.

Non-Final Office Action from U.S. Appl. No. 14/253,713, Aug. 12, 2015, 17 pages.

Non-Final Office Action from U.S. Appl. No. 14/253,713, Sep. 3, 2014, 26 pages.

Non-Final Office Action from U.S. Appl. No. 14/253,744, Jul. 5, 2016, 31 pages.

Non-Final Office Action from U.S. Appl. No. 14/253,744, Jun. 10, 2015, 50 pages.

Non-Final Office Action from U.S. Appl. No. 14/253,744, Oct. 6, 2014, 34 pages.

Non-Final Office Action from U.S. Appl. No. 14/253,753, Jul. 1, 2016, 21 pages.

Non-Final Office Action from U.S. Appl. No. 14/253,753, Jul. 28, 2015, 14 pages.

Non-Final Office Action from U.S. Appl. No. 14/253,753, Sep. 5, 2014, 16 pages.

Non-Final Office Action from U.S. Appl. No. 14/253,767, Jul. 15, 2015, 17 pages.

Non-Final Office Action from U.S. Appl. No. 14/253,767, Jun. 19, 2014, 13 pages.

Non-Final Office Action from U.S. Appl. No. 14/253,767, Sep. 19, 2016, 21 pages.

Non-Final Office Action from U.S. Appl. No. 14/528,898, Mar. 31, 2016, 17 pages.

Non-Final Office Action from U.S. Appl. No. 14/528,918, Feb. 17, 2016, 17 pages.

Non-Final Office Action received for U.S. Appl. No. 15/276,756, Jul. 30, 2018, 25 pages.

Non-Final Office Action received for U.S. Appl. No. 15/276,756, Sep. 3, 2019, 27 pages.

Notice of Allowance from U.S. Appl. No. 14/528,918, Aug. 18, 2016, 5 pages.

Notice of Allowance, U.S. Appl. No. 16/944,433, Jan. 31, 2023, 23 pages.

Notice of Allowance, U.S. Appl. No. 15/276,756, May 7, 2020, 17 pages.

* cited by examiner

Original Search:
Search “error” | stats count BY host

804

Sent to peers:
Search “error” | prestats count BY host

806

Executed by search head:
Aggregate the prestats results received from peers

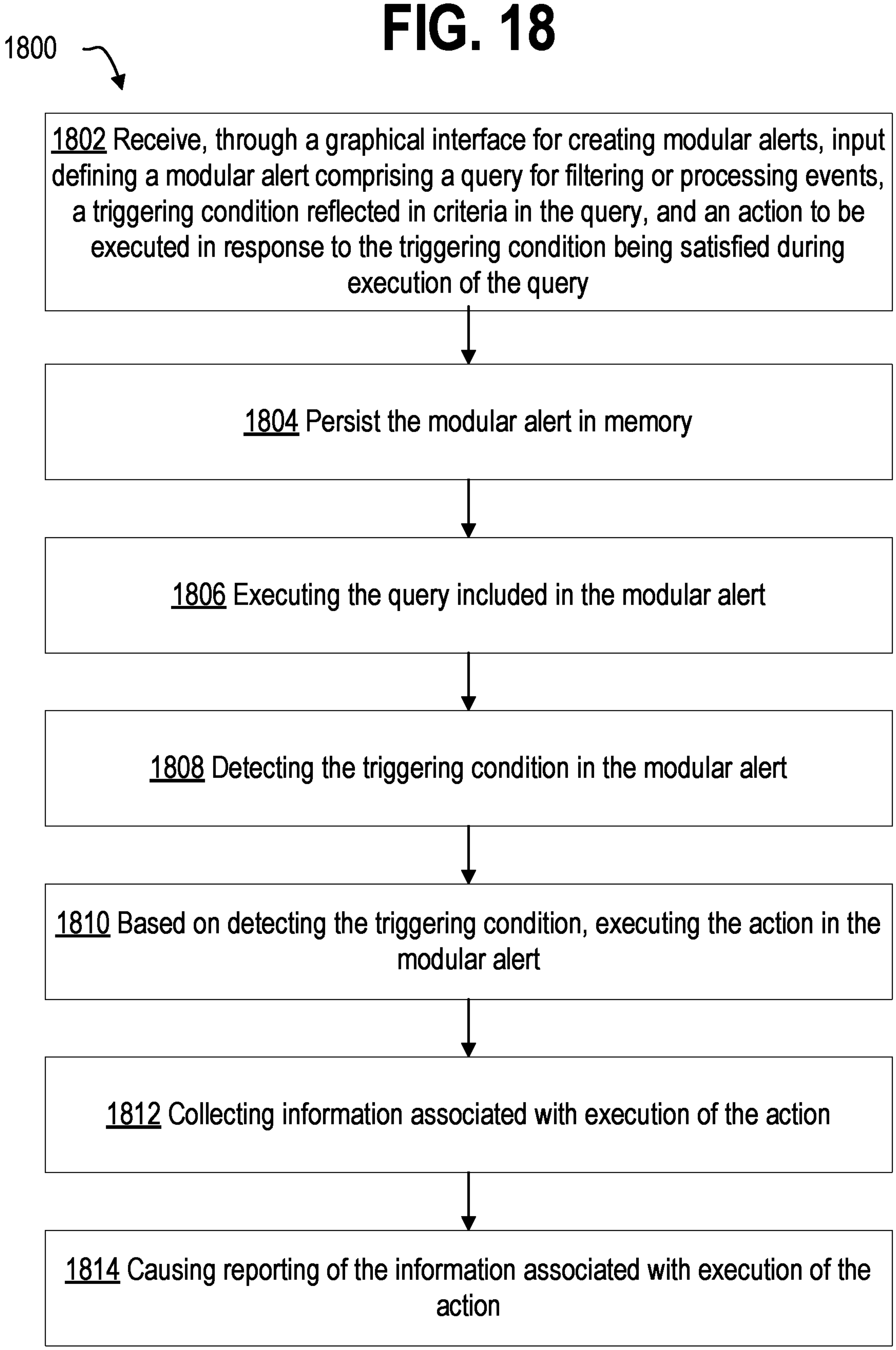

1802 Receive, through a graphical interface for creating modular alerts, input defining a modular alert comprising a query for filtering or processing events, a triggering condition reflected in criteria in the query, and an action to be executed in response to the triggering condition being satisfied during execution of the query

↓

1804 Persist the modular alert in memory

↓

1806 Executing the query included in the modular alert

↓

1808 Detecting the triggering condition in the modular alert

↓

1810 Based on detecting the triggering condition, executing the action in the modular alert

↓

1812 Collecting information associated with execution of the action

↓

1814 Causing reporting of the information associated with execution of the action

FIG. 21
2100
Next Steps
Insert Adaptive Response Action
2102
Describe next steps and response actions that an analyst could take to address this threat. Add a link to an action with the syntax [[action|nameOfAction]].

2610

2612

2614

2616

2618

2620

EXECUTING MODULAR ALERTS AND ASSOCIATED SECURITY ACTIONS

CROSS-REFERENCE TO RELATED APPLICATIONS

This application claims benefit under 35 U.S.C. § 120 as a continuation of U.S. application Ser. No. 16/944,433, filed Jul. 31, 2020, which is a continuation of U.S. application Ser. No. 15/276,756, filed Sep. 26, 2016, now U.S. Pat. No. 10,771,479, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

Embodiments relate generally to computer network security, and, more specifically, to techniques for configuring actions to be performed by a security application in response to the detection of potential security incidents, and for reporting on the performance of those actions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many types of organizations today rely on systems of networked computing devices for an increasingly wide variety of business operations. These networked computing systems often include a wide variety of computing device types ranging from desktop computers, laptops, mobile devices, servers, network devices, etc. As the reliance on these and similar systems has grown, so too has the importance securing these systems and the various components thereof against internal and external threats such as malware, viruses, network-based attacks, and other types of security threats. Organizations increasingly rely on security information and event management (SIEM) software and other similar applications to monitor and address threats to these systems. However, effectively identifying and remediating security threats of ever-increasing complexity remains a challenge.

BRIEF DESCRIPTION OF THE DRAWINGS

In the drawings:

FIG. 8 illustrates an example search query received from a client and executed by search peers in accordance with the disclosed embodiments;

FIG. 18 is a flow diagram illustrating a process for configuring modular alerts and for reporting the performance of modular alert actions in accordance with the disclosed embodiments;

DETAILED DESCRIPTION

Figure 1:
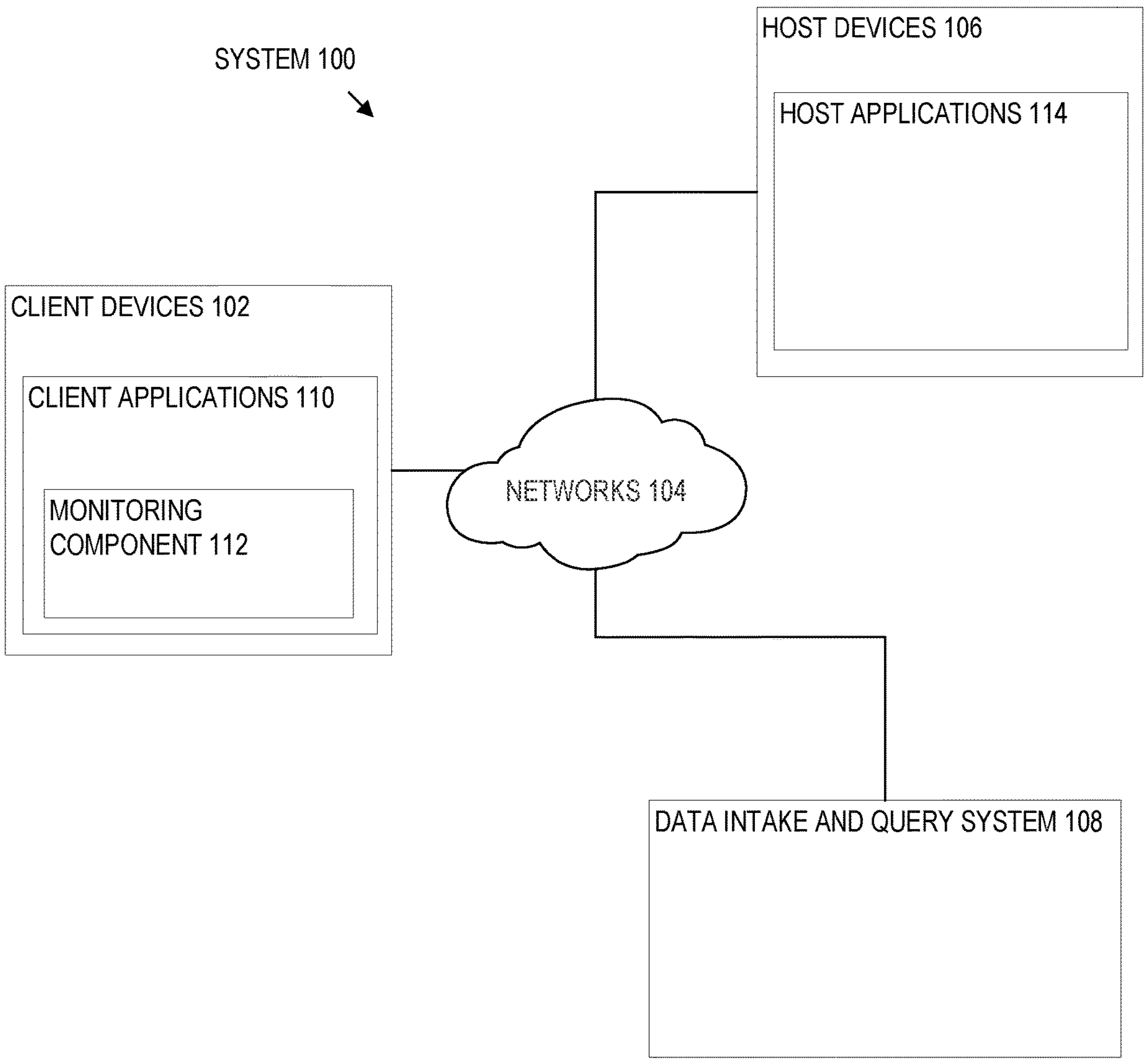
FIG. 1 illustrates a networked computer environment in which an embodiment may be implemented.

In the following description, for the purposes of explanation, numerous specific details are set forth in order to provide a thorough understanding embodiments of the present invention. It will be apparent, however, that embodiments of the present invention may be practiced without these specific details. In other instances, well-known structures and devices are shown in block diagram form in order to avoid unnecessarily obscuring embodiments the present invention.

Embodiments are described herein according to the following outline:

1.0. General Overview
2.0. Operating Environment
2.1. Host Devices
2.2. Client Devices
2.3. Client Device Applications
2.4. Data Server System
2.5. Data Ingestion
2.5.1. Input
2.5.2. Parsing
2.5.3. Indexing
2.6. Query Processing
2.7. Field Extraction
2.8. Example Search Screen
2.9. Data Modelling
2.10. Acceleration Techniques
2.10.1. Aggregation Technique
2.10.2. Keyword Index
2.10.3. High Performance Analytics Store
2.10.4. Accelerating Report Generation
2.11. Security Features
2.12. Data Center Monitoring
2.13. Cloud-Based System Overview
2.14. Searching Externally Archived Data
2.14.1. ERP Process Features
3.0. Functional Overview
3.1. Configuring and Reporting on Modular Alert Actions
3.2. Orchestrating Modular Alert Actions
3.3. Interactive Electronic Runbooks
3.4. Modular Alert Action Builder
4.0. Example Embodiments
5.0. Implementation Mechanism-Hardware Overview
6.0. Extensions and Alternatives

1.0. GENERAL OVERVIEW

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters forms a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. OPERATING ENVIRONMENT

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
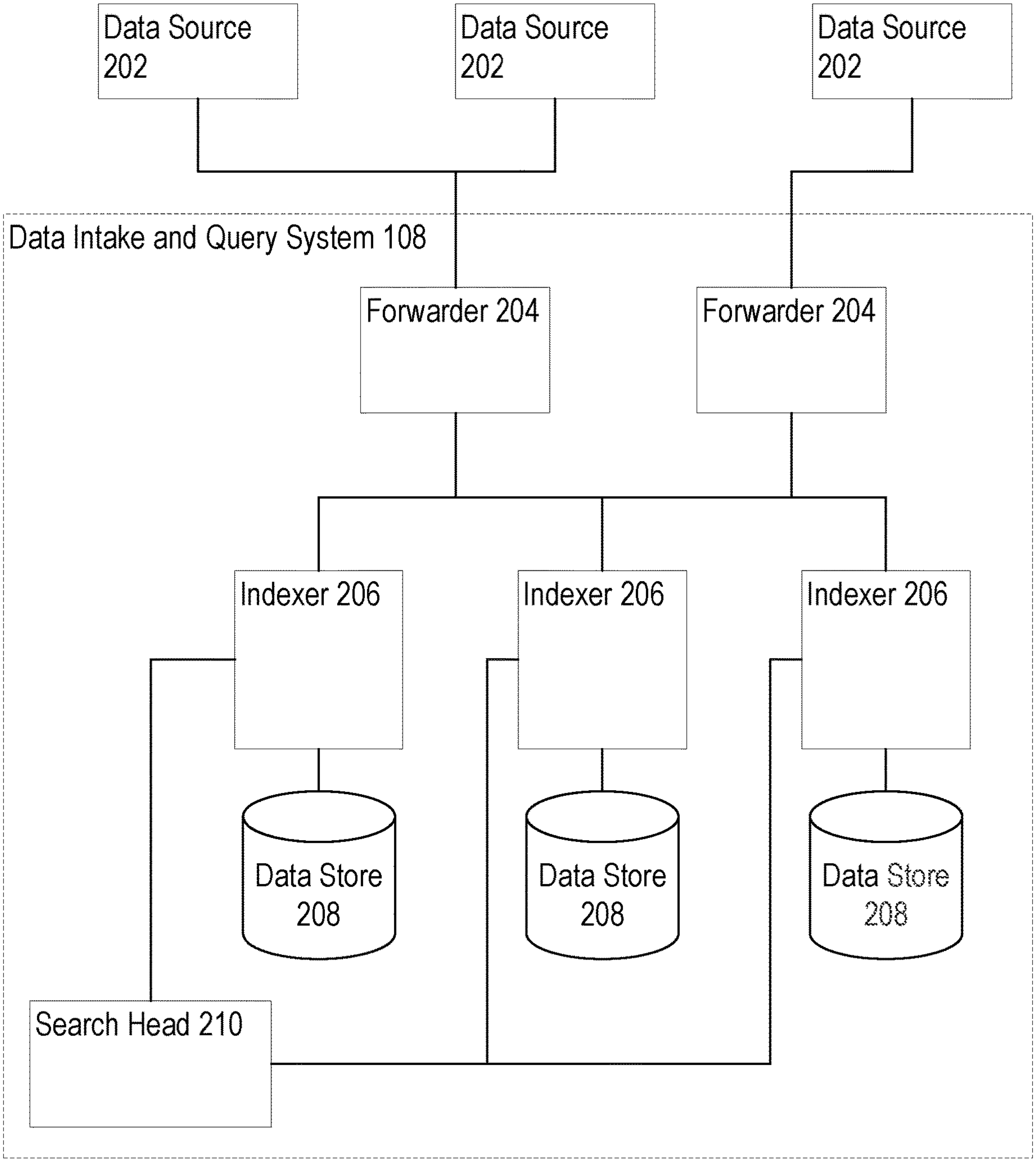
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
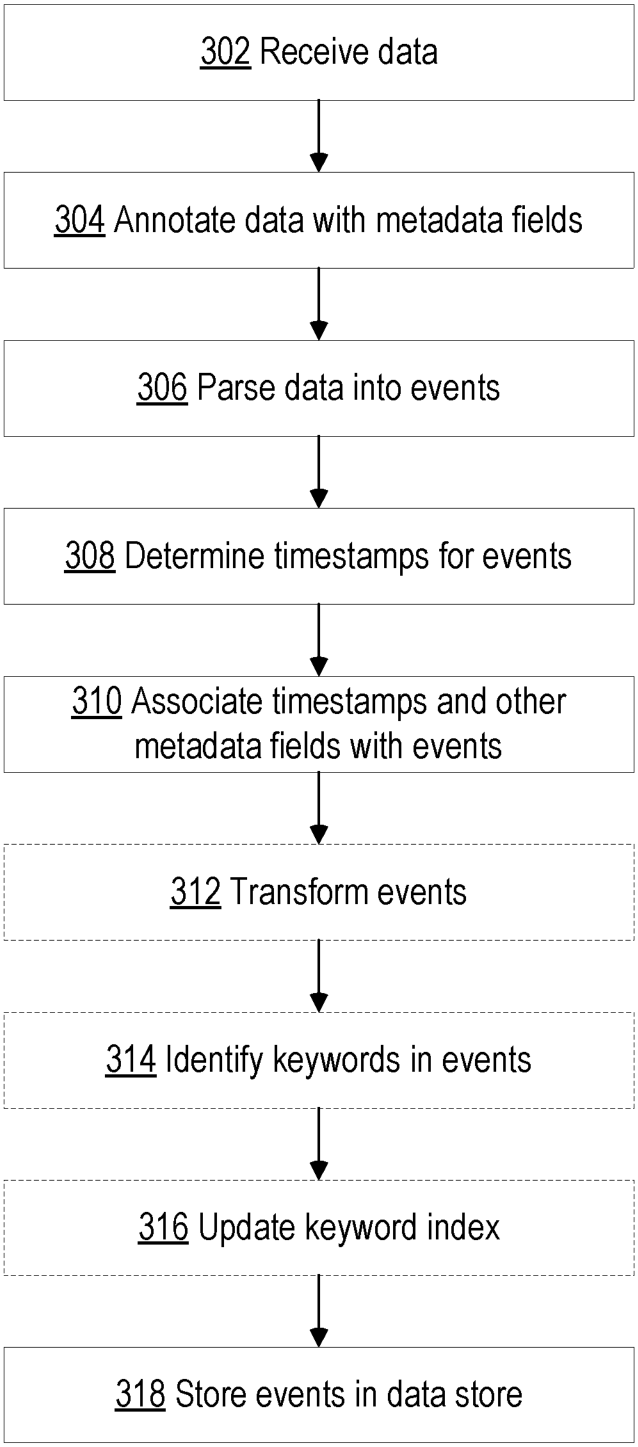
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
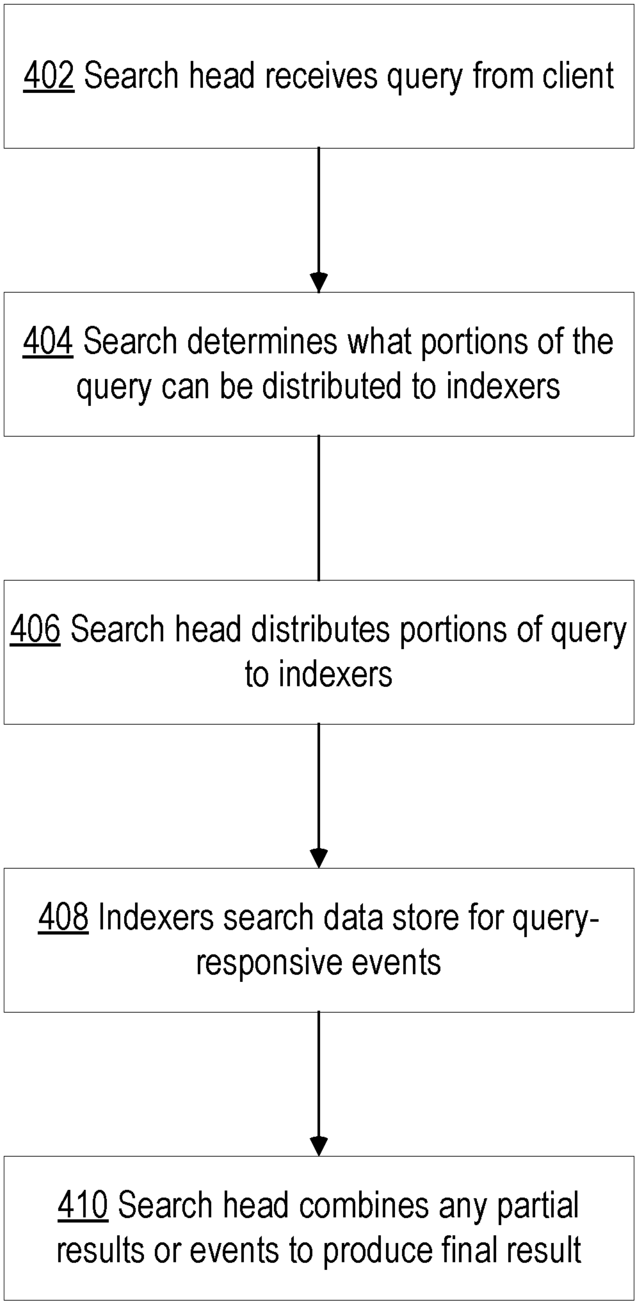
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

2.7. Field Extraction

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
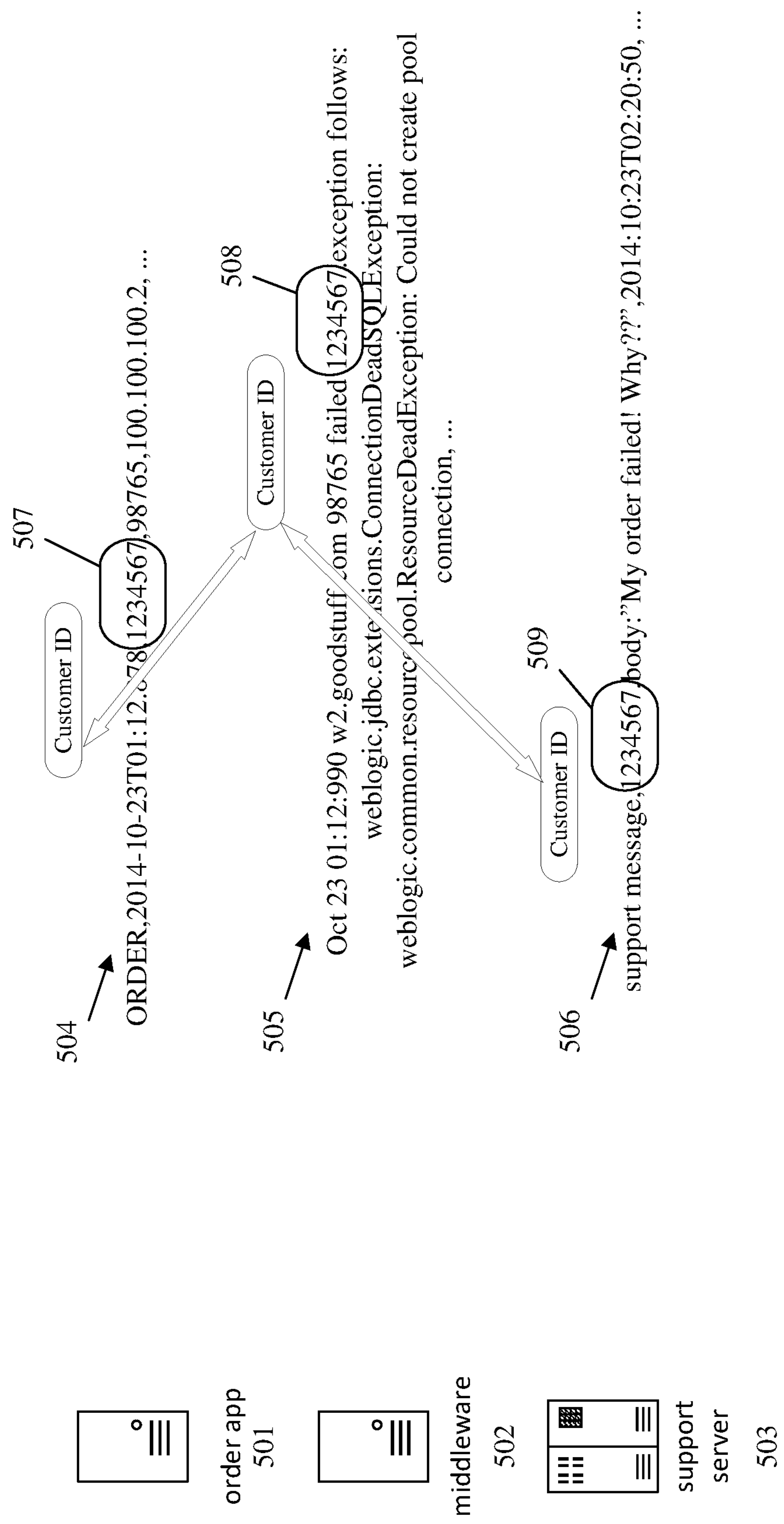
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
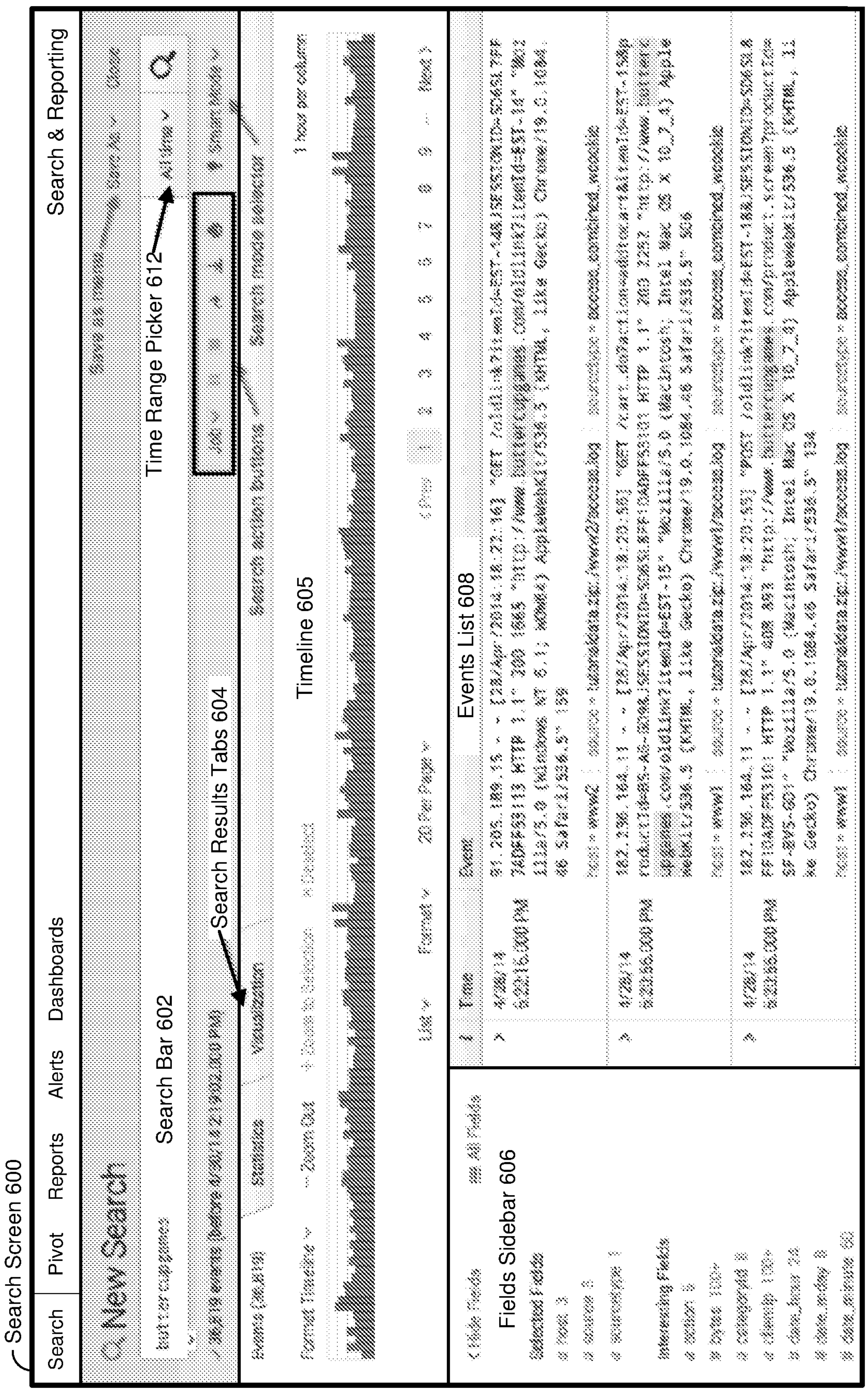
FIG. 6A illustrates a search screen in accordance with the disclosed embodiments.
Figure 6B:
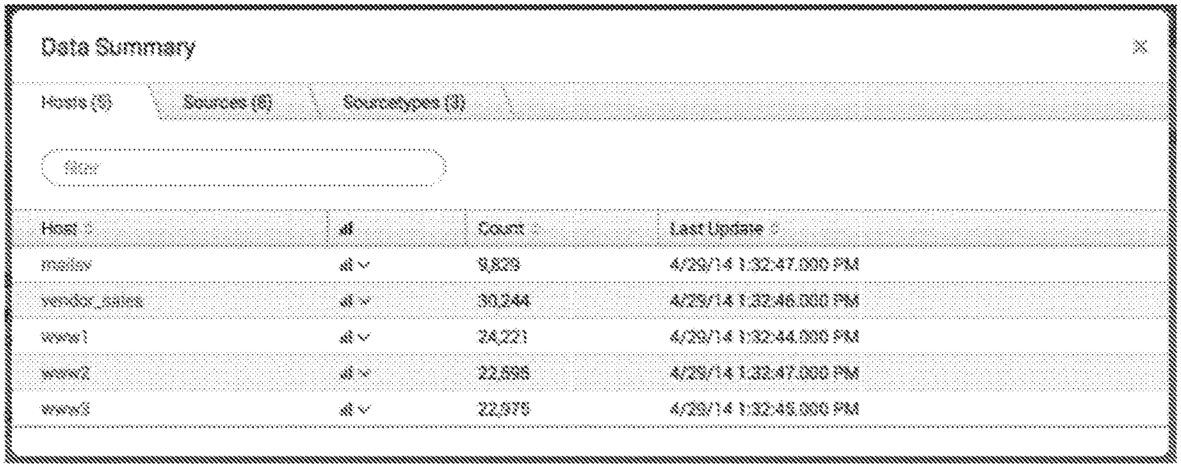
FIG. 6B illustrates a data summary dialog that enables a user to select various data sources in accordance with the disclosed embodiments.

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
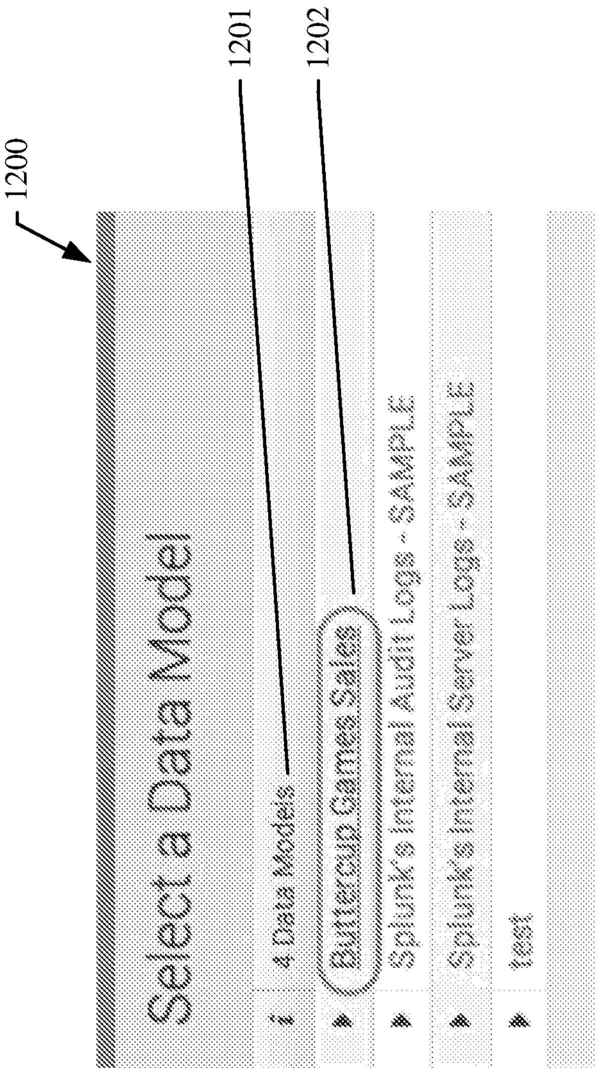
FIGS. 12-14 illustrate a series of user interface screens for an example data model-driven report generation interface in accordance with the disclosed embodiments.

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
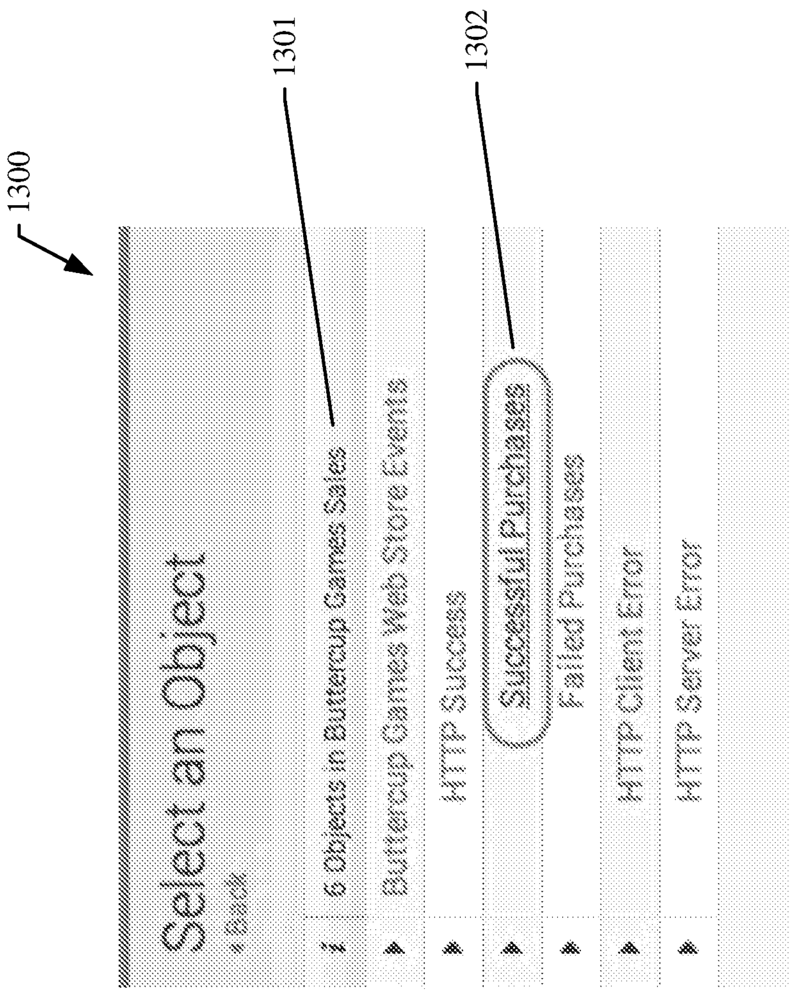

FIG. 13 illustrates an example data model object selection graphical user interface 1300 that displays available data objects 1301 for the selected data object model 1202. The user may select one of the displayed data model objects 1302 for use in driving the report generation process.

Figure 7A:
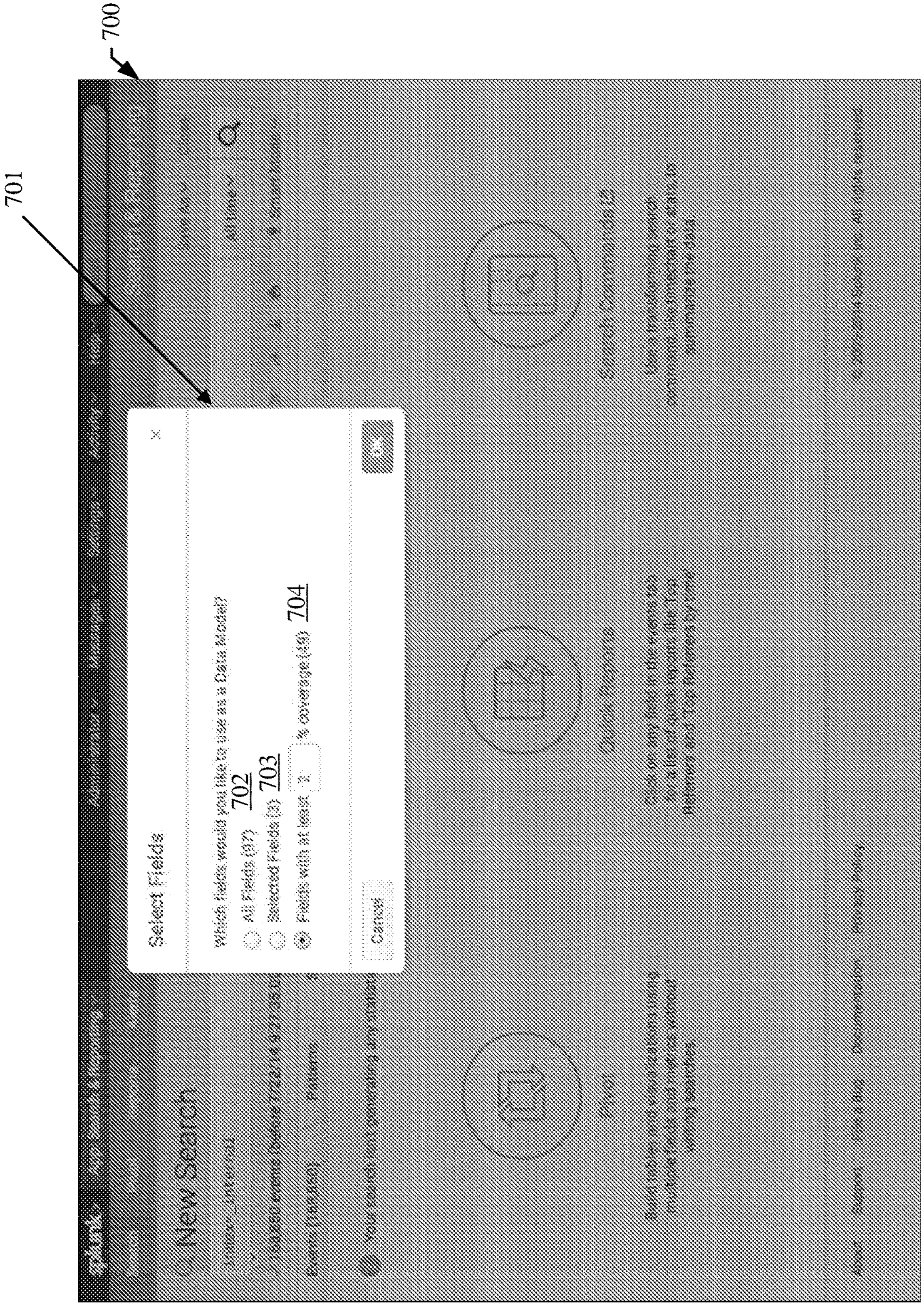
FIGS. 7A-7D illustrate a series of user interface screens for an example data model-driven report generation interface in accordance with the disclosed embodiments.

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifics a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
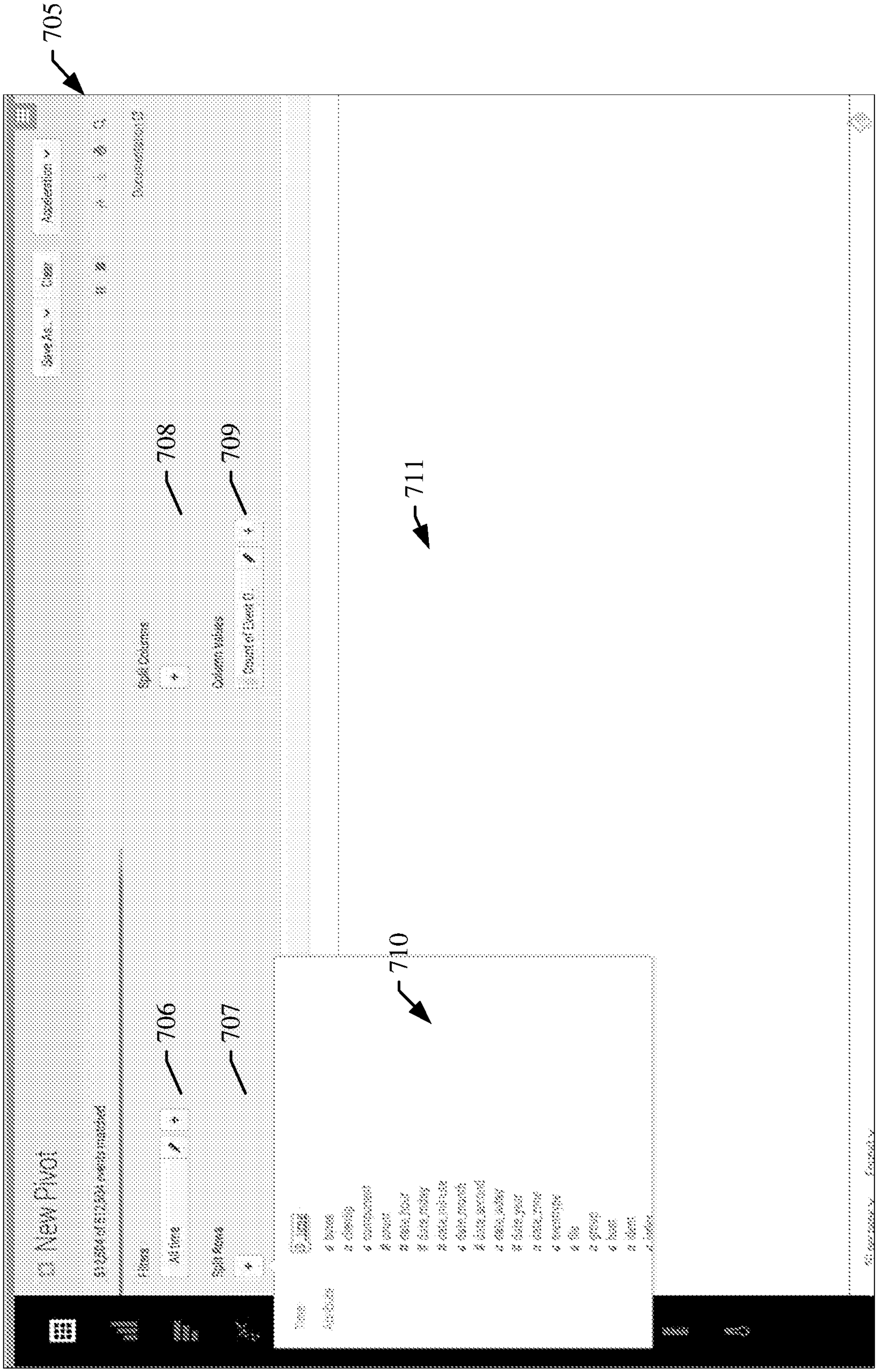
Figure 7C:
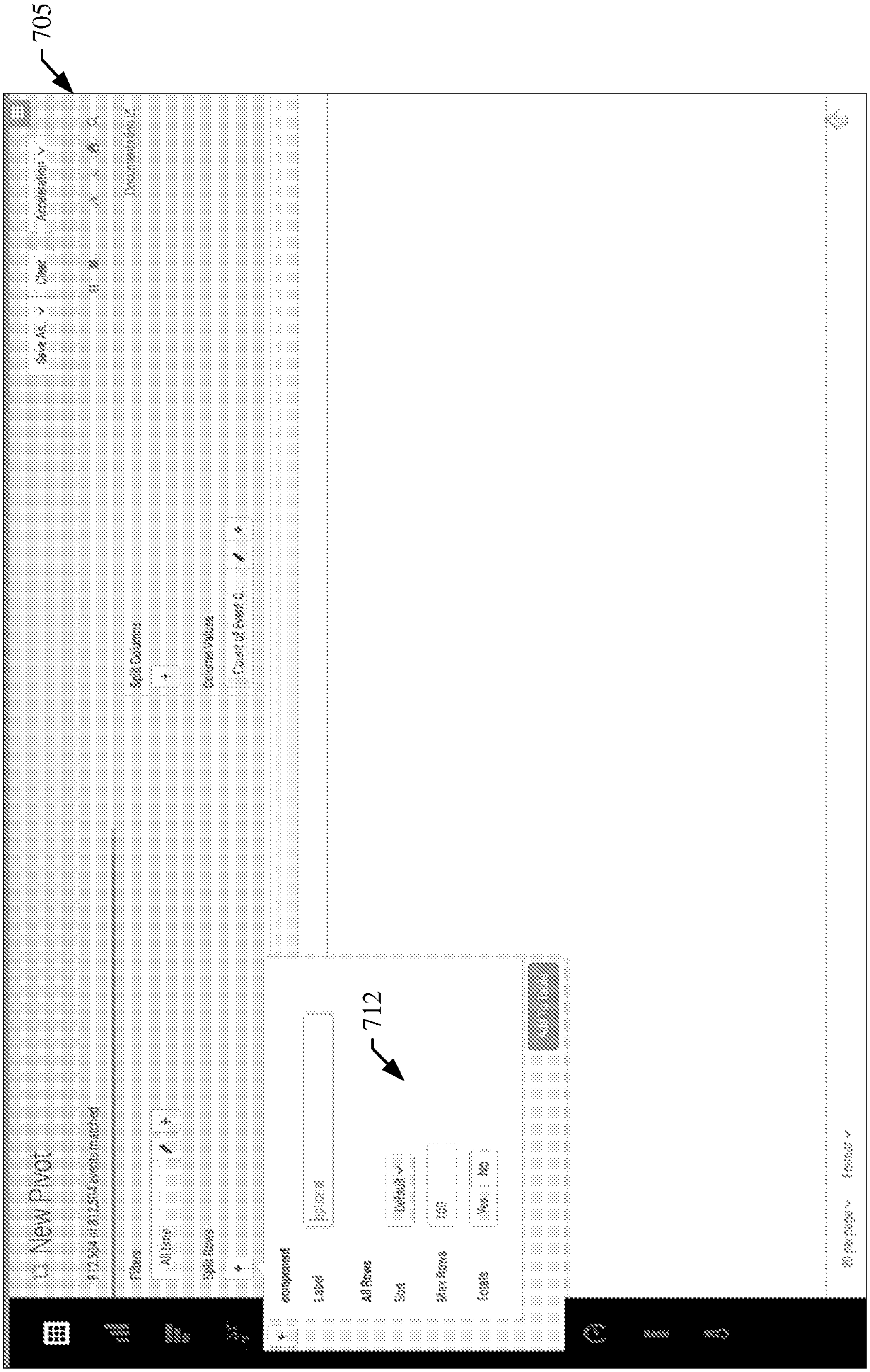

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
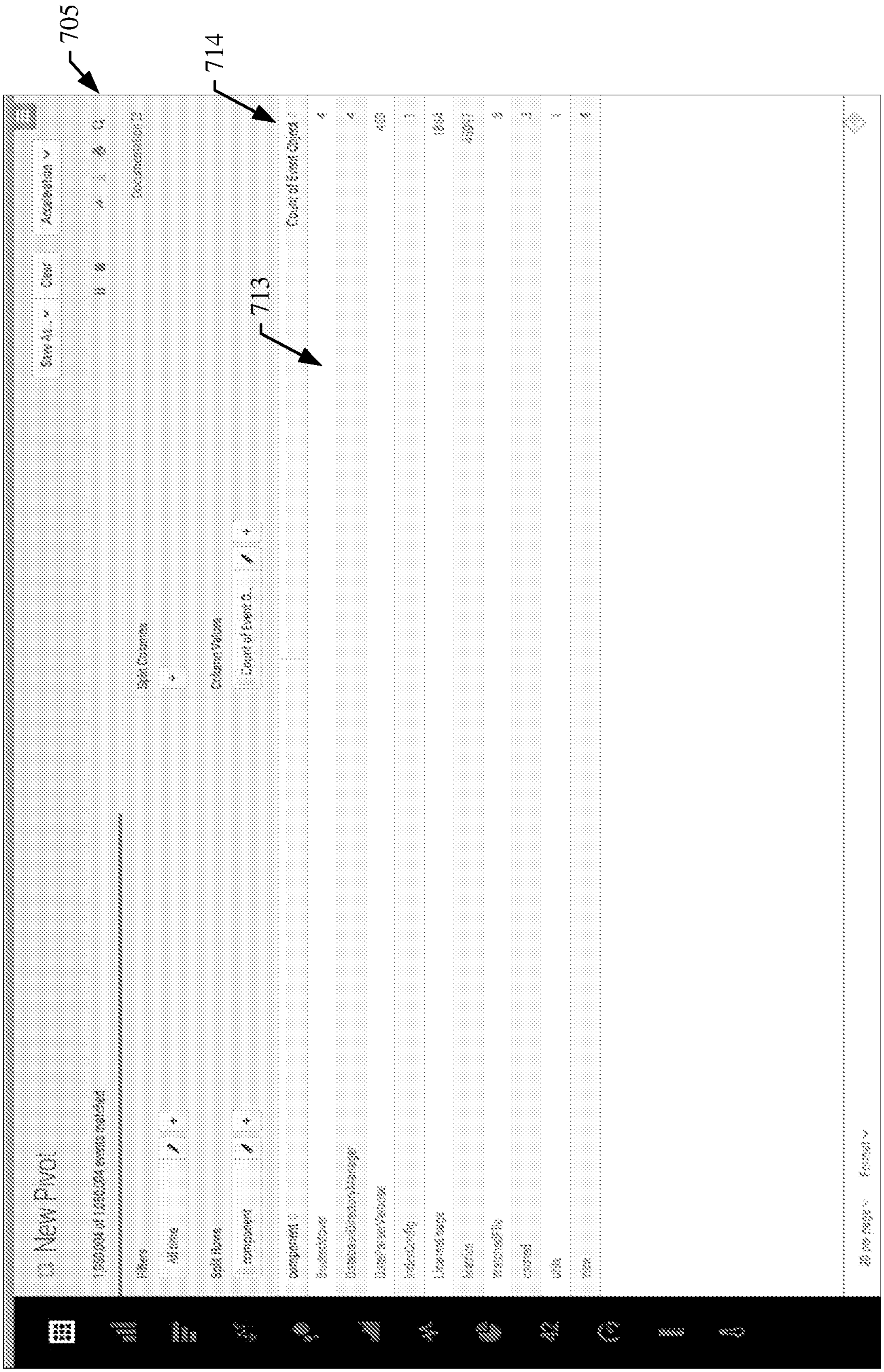

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

Figure 14:
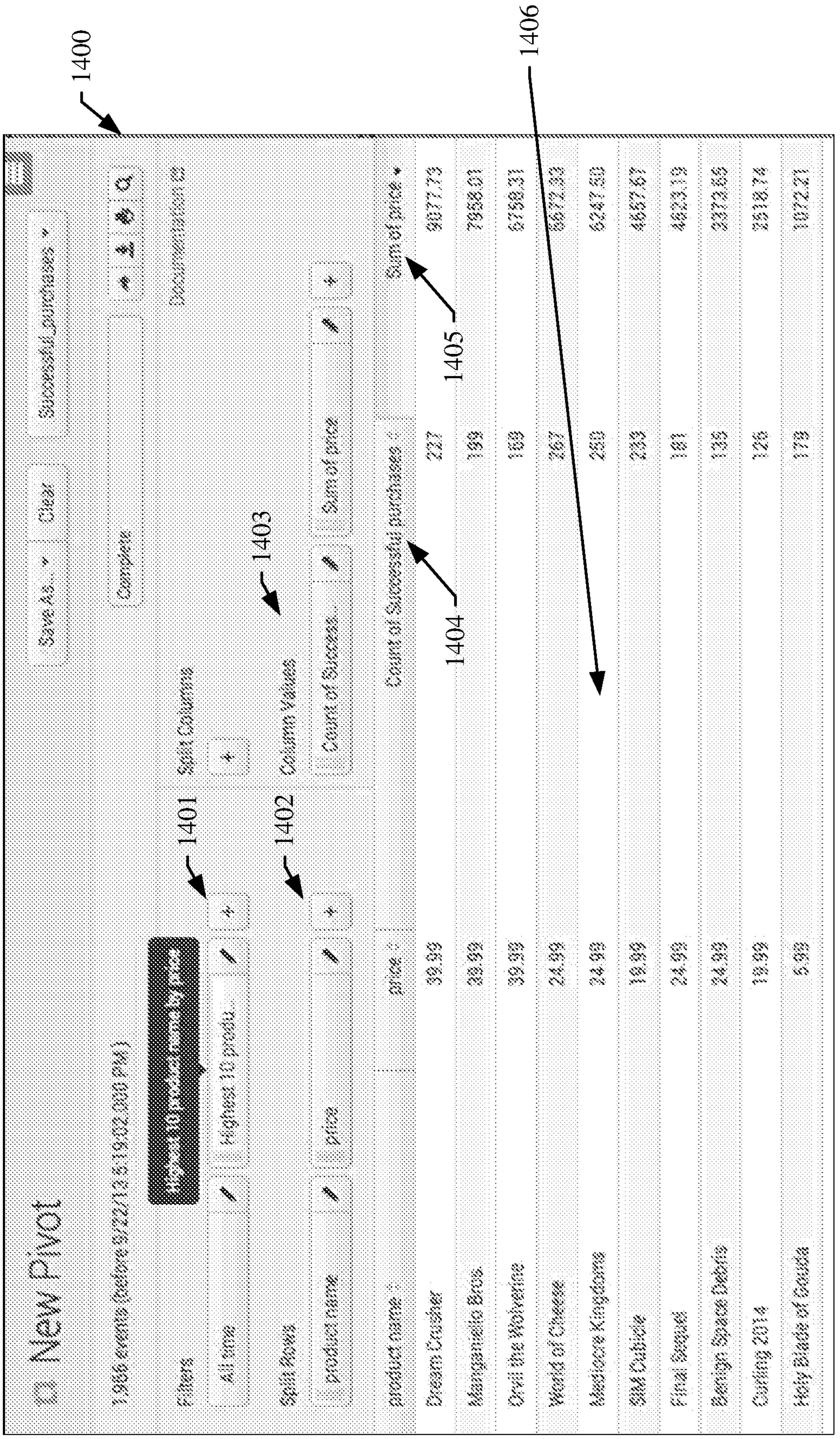

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistic may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 15:
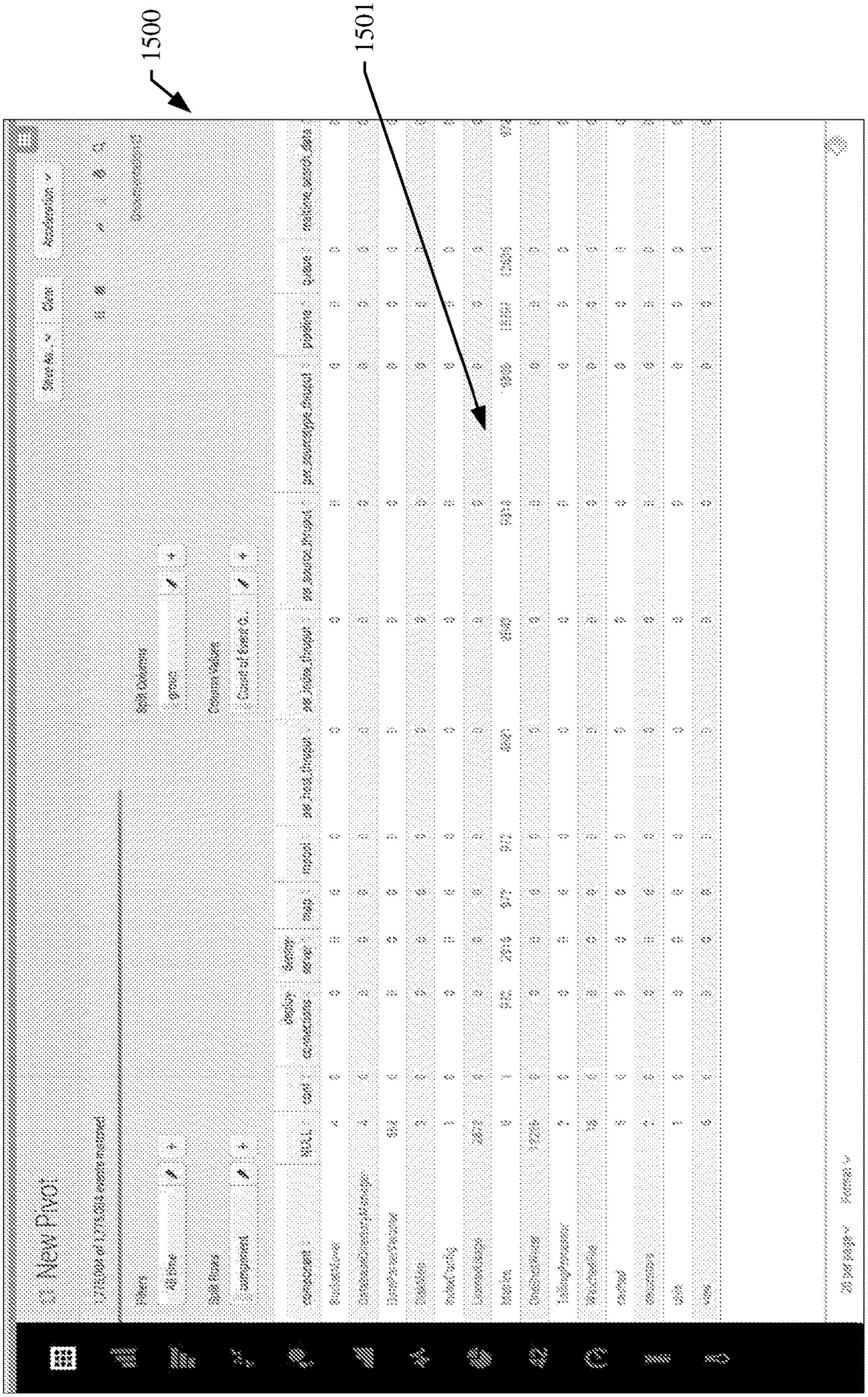
FIGS. 15-17 illustrate example visualizations generated by a reporting application in accordance with the disclosed embodiments.
Figure 16:
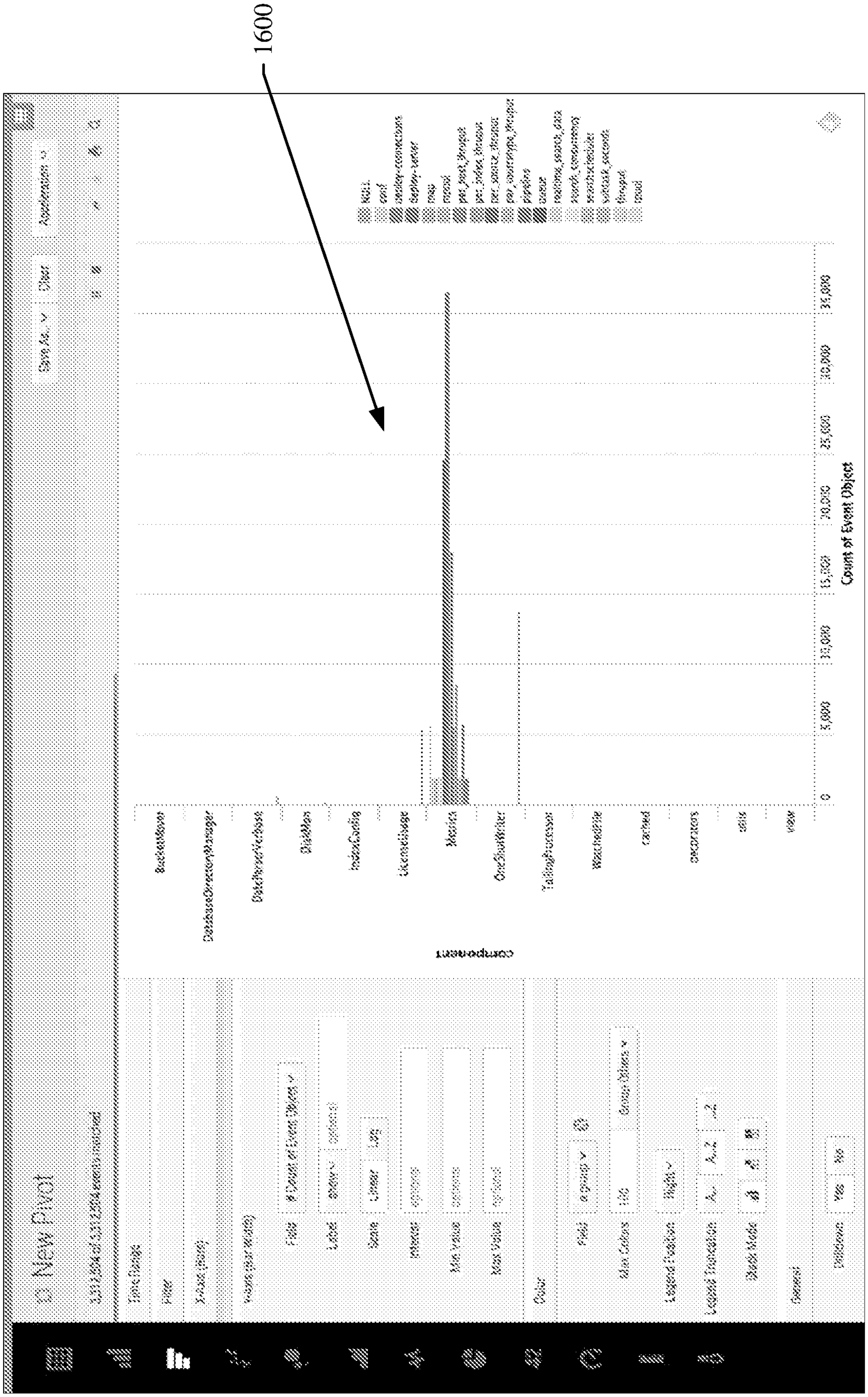
Figure 17:
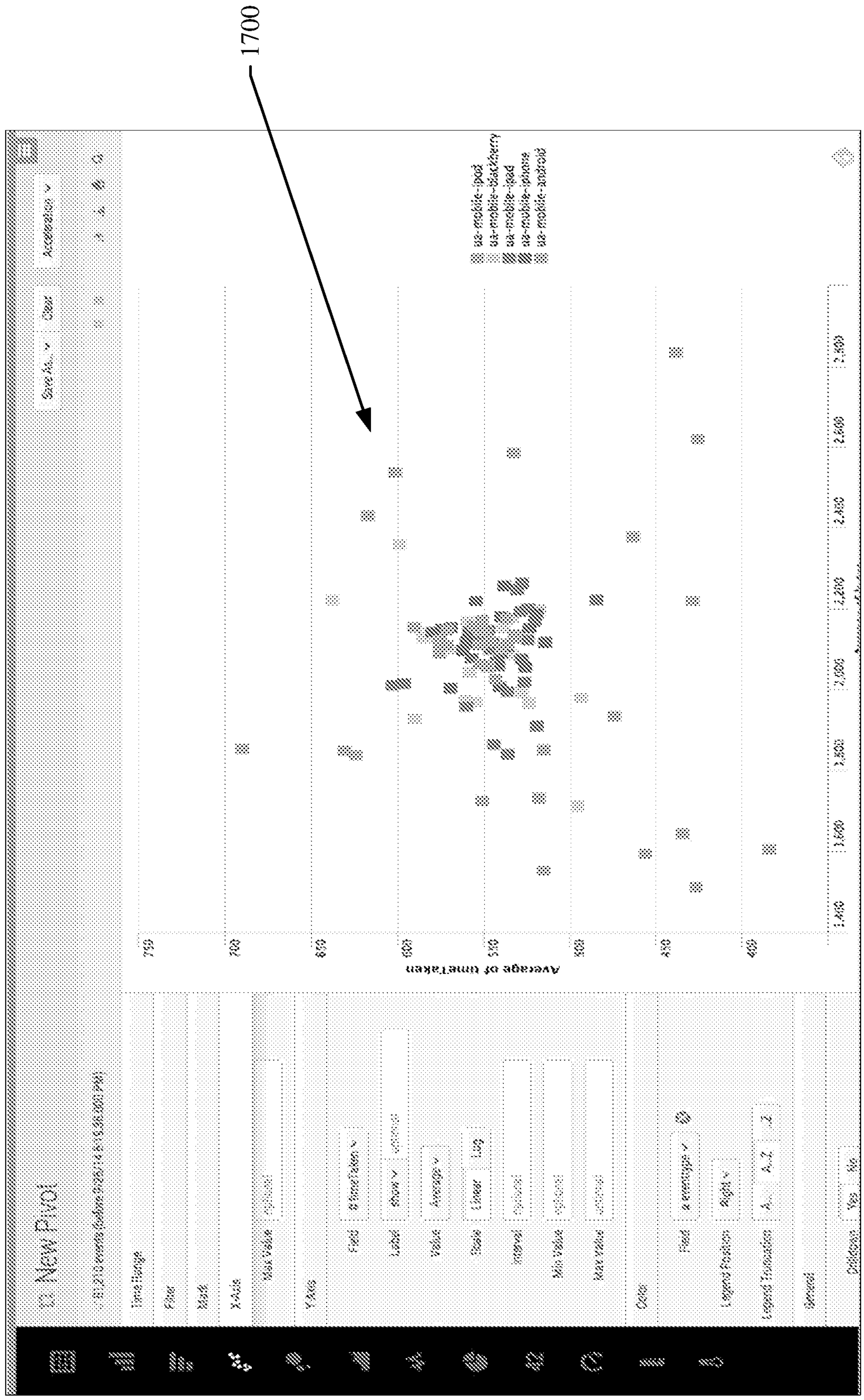

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. ACCELERATION TECHNIQUE

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
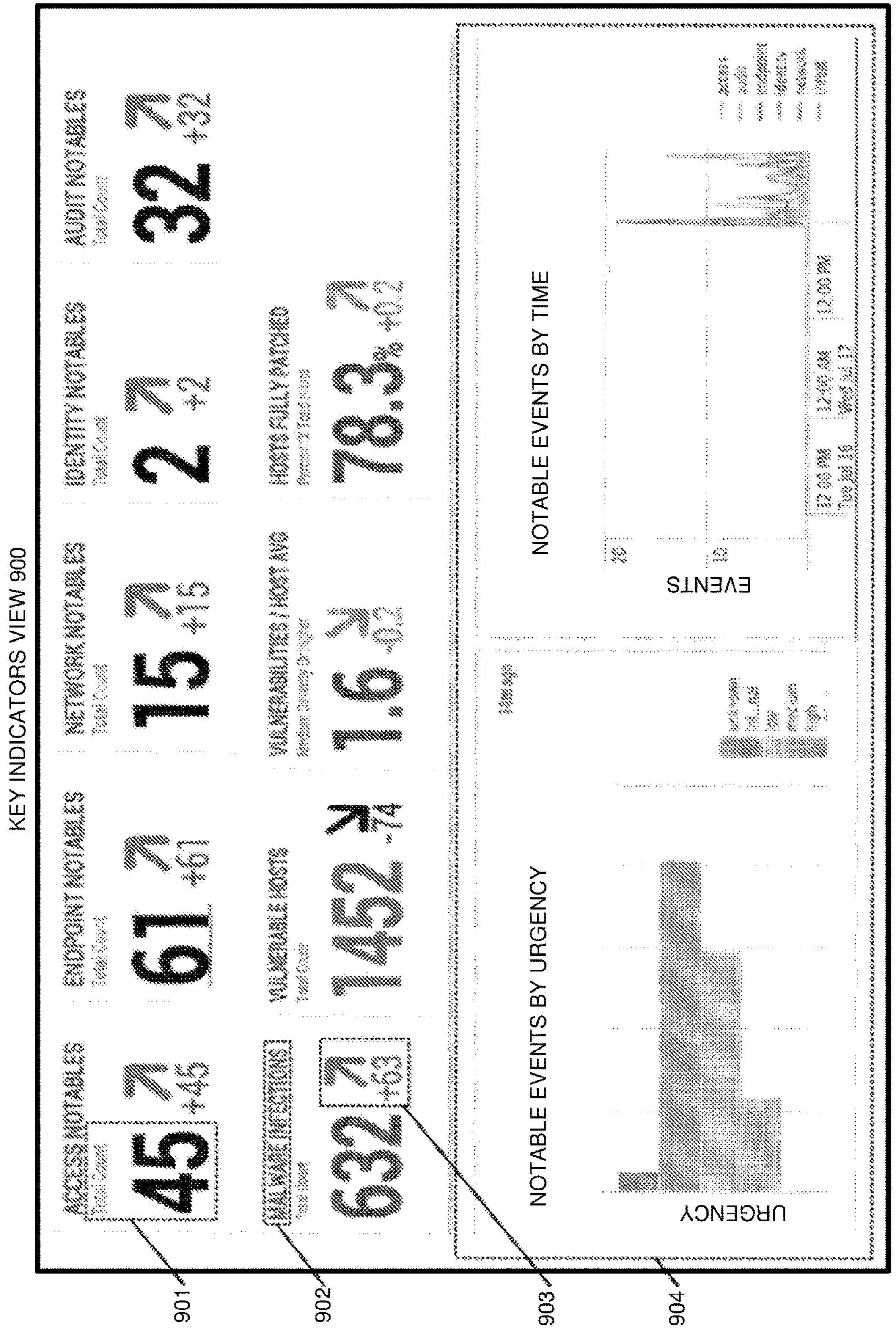
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
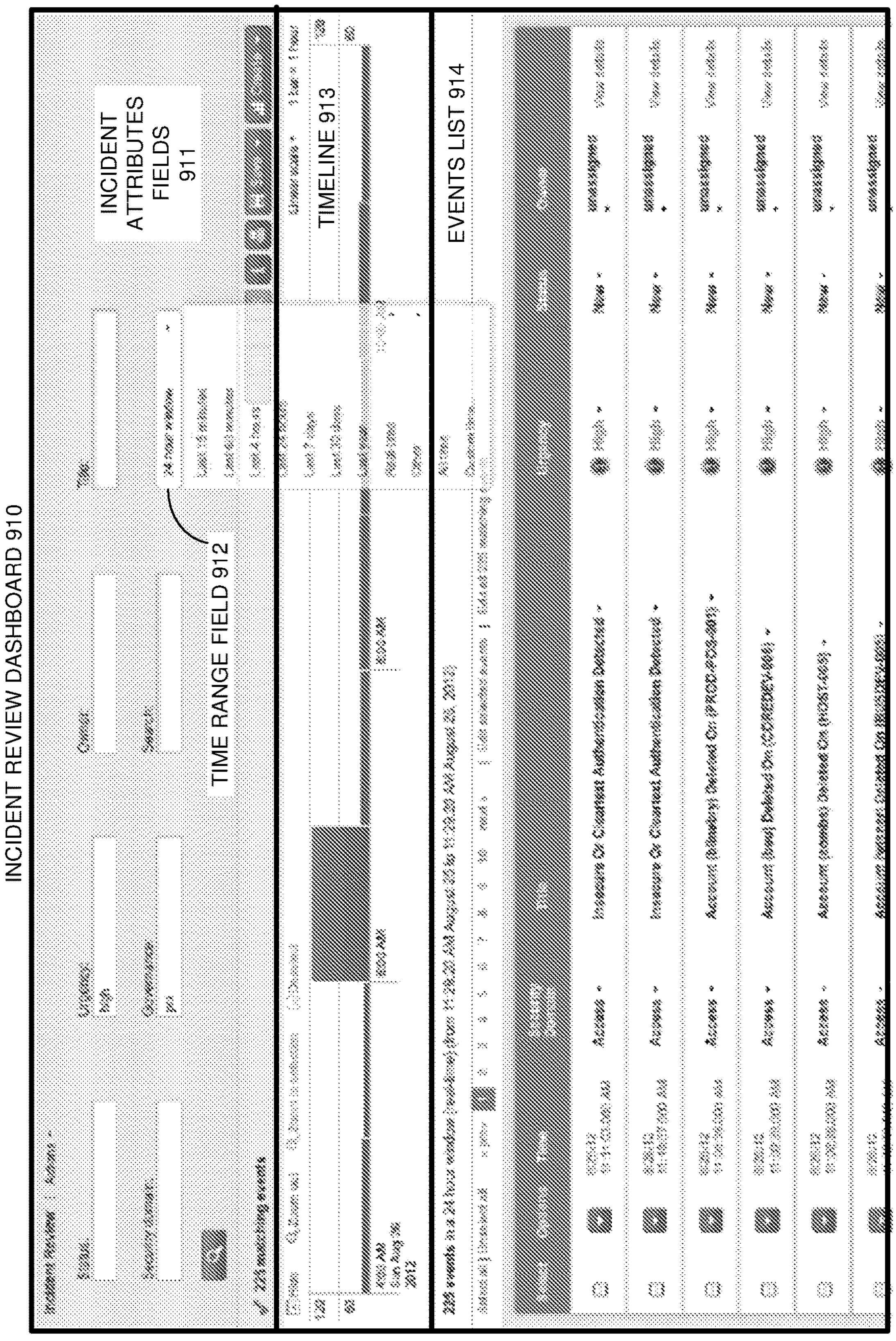
FIG. 9B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
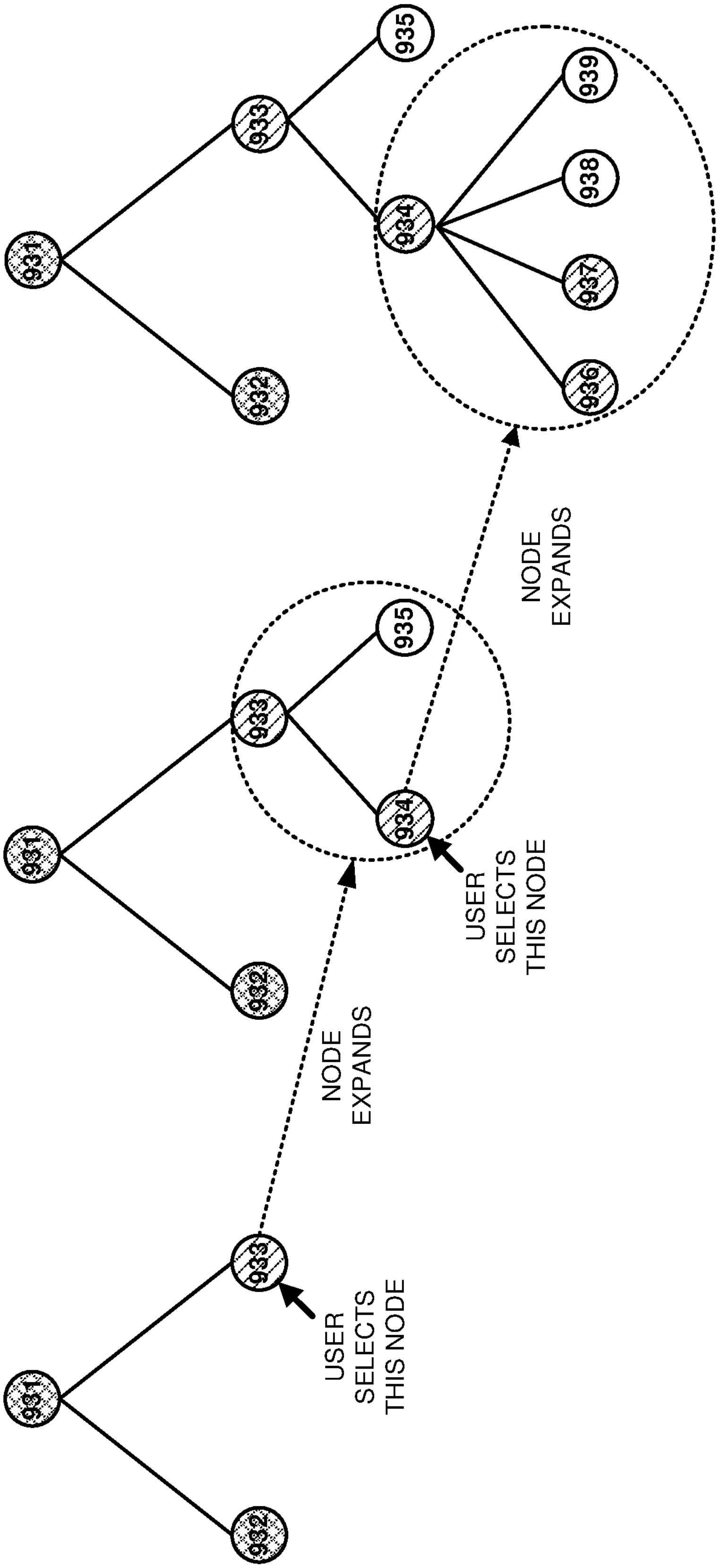
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The case of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
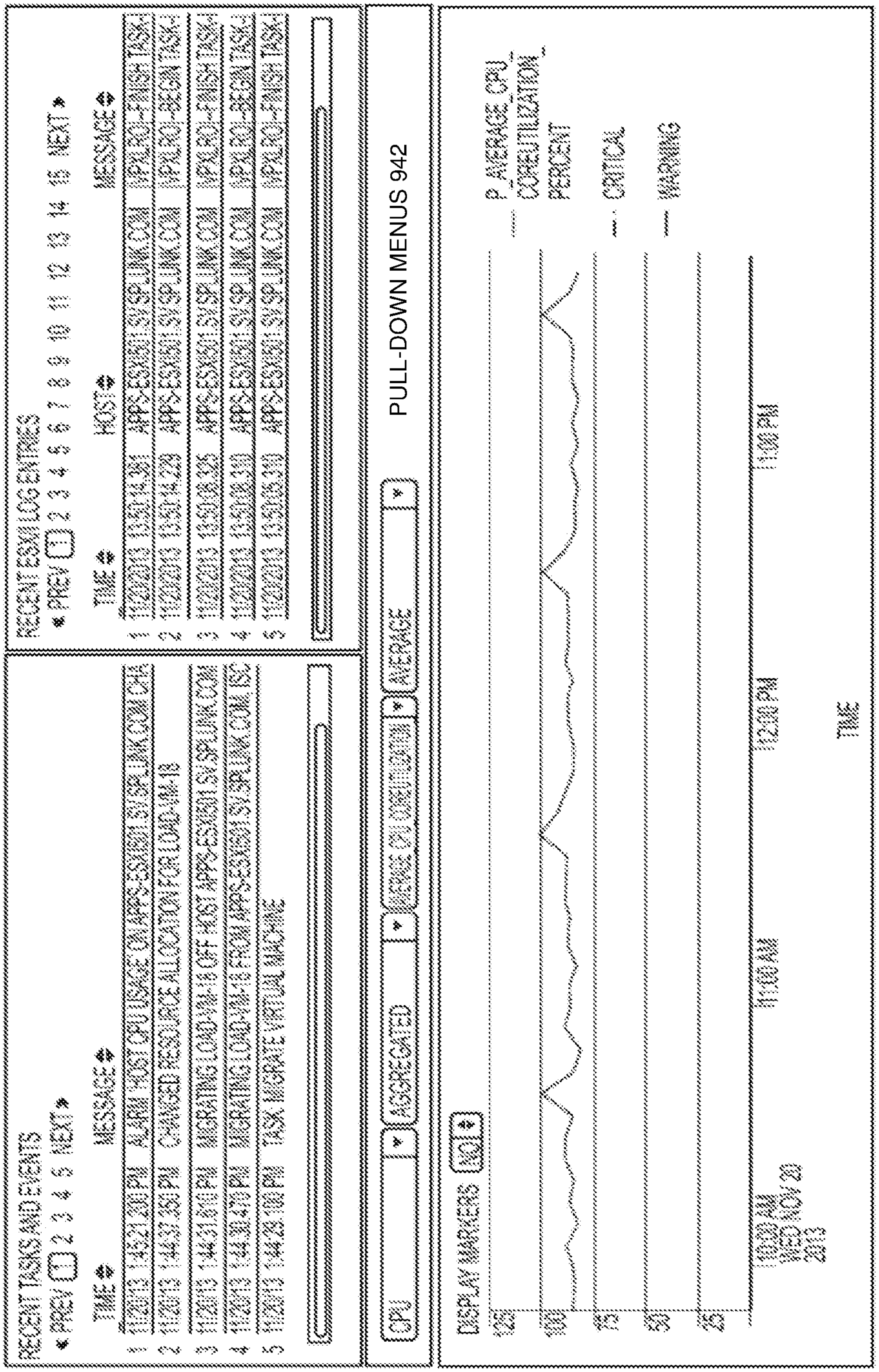
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
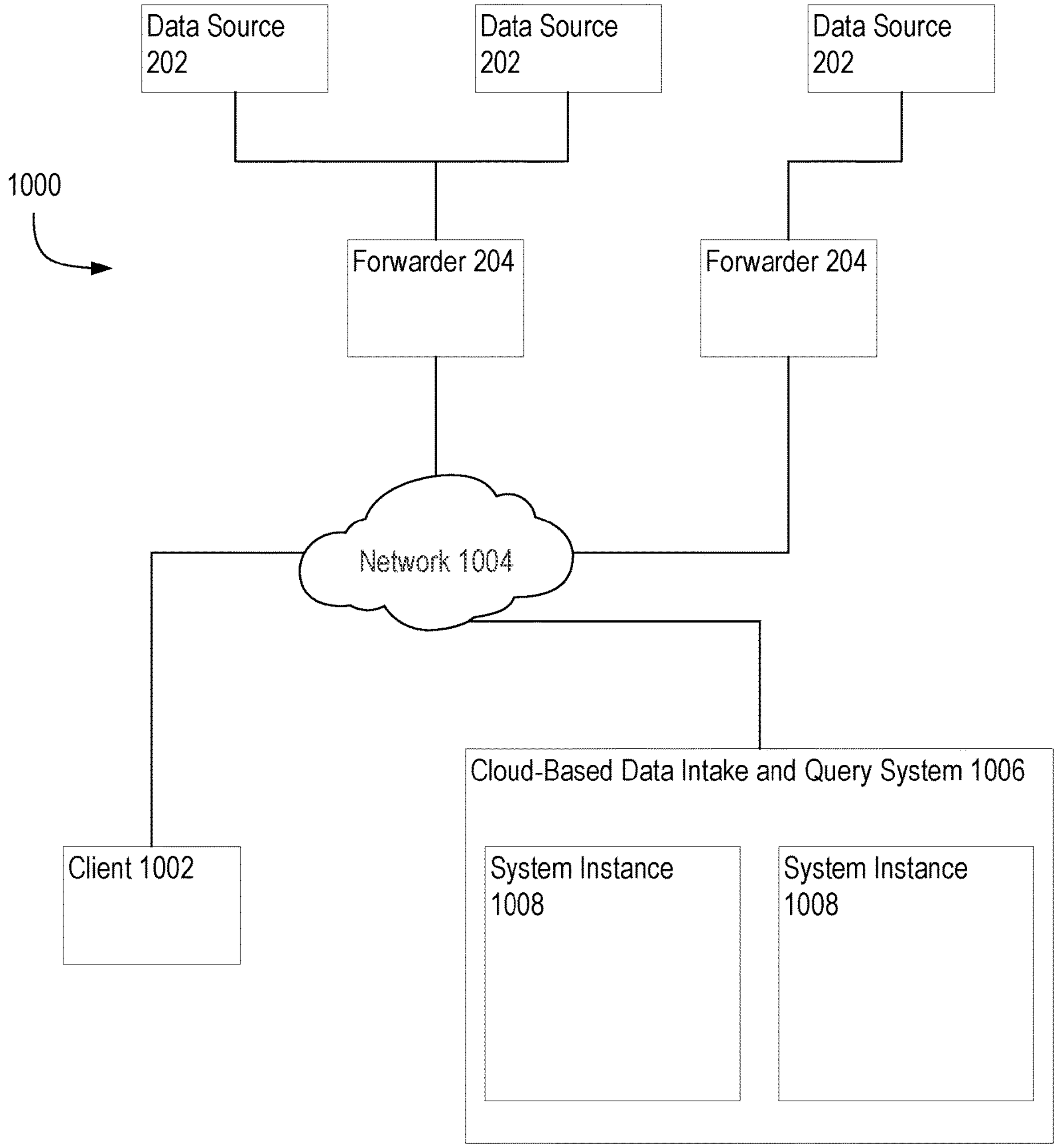
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ Mare centrally visible).

2.14. Searching Externally Archived Data

Figure 11:
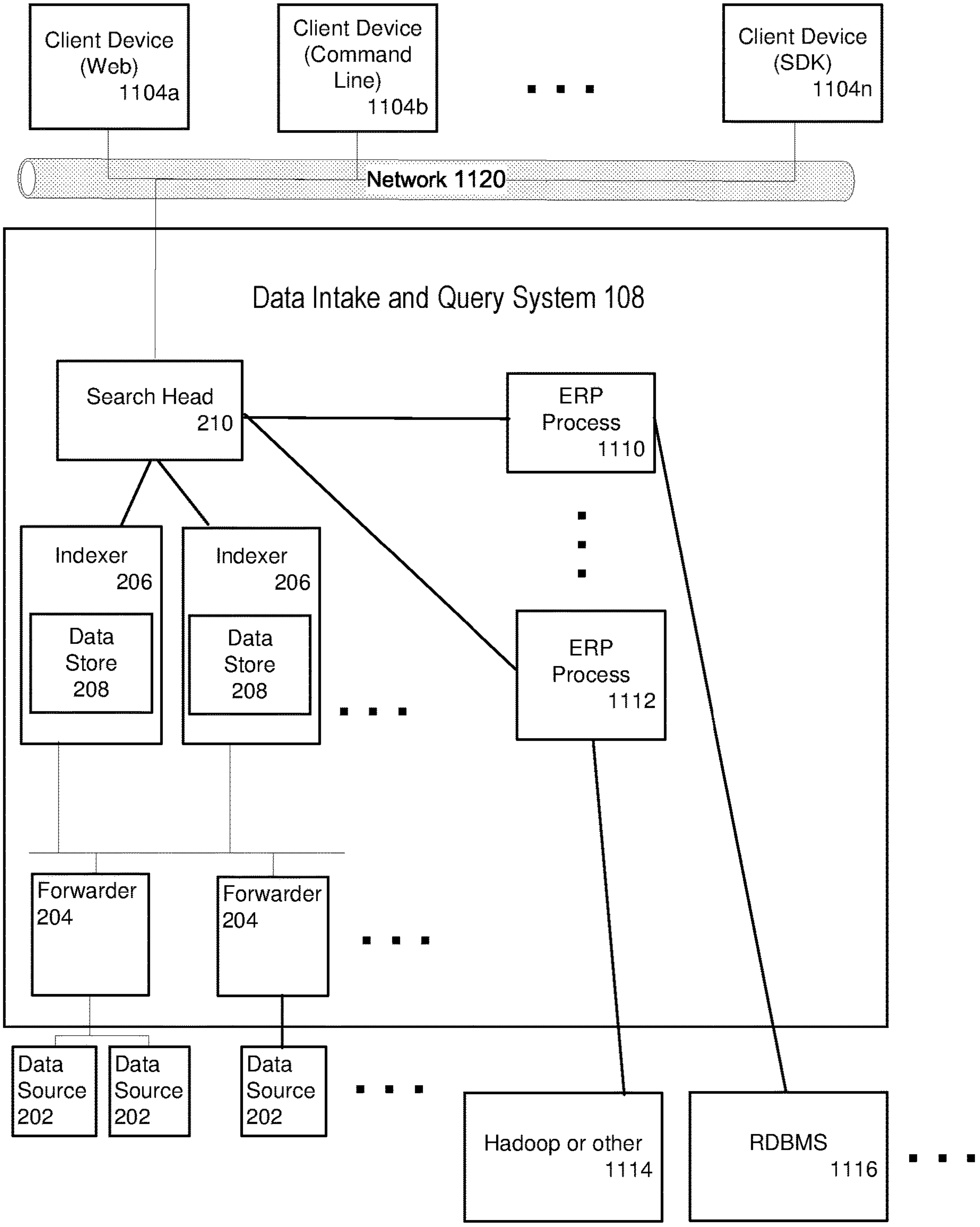
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, California. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104*a*, 1104*b*, . . . , 1104*n* may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. It Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, California.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0. FUNCTIONAL OVERVIEW

Approaches, techniques, and mechanisms are disclosed for configuring actions to be performed by a network security application in response to the detection of potential security incidents, and for causing the network security application to report on the performance of those actions. In one embodiment, a network security application such as, for example, the SPLUNK® APP FOR ENTERPRISE SECURITY described above in Section 2.11 enables users to configure "modular alerts." As used herein, a modular alert generally represents a component of a network security application which enables users to specify actions to be performed by the network security application in response to the detection of one or more defined triggering conditions based on a query, and which further enables tracking information related to the performance of the actions and reporting the information via one or more graphical interfaces or other displays.

In an embodiment, a modular alert comprises at least one query for filtering or processing event data to identify event data of interest (e.g., event data indicating an occurrence of a potential security threat), a triggering condition reflected in criteria in the query (e.g., to indicate when event data identified by the query indicates that a potential security threat has occurred), and at least one action to be executed in response to the triggering condition. For example, the at least one action may involve obtaining additional information related to a potential security threat identified by the query (e.g., by executing one or more additional queries for event data, by requesting additional data from one or more external security applications, etc.) and/or causing performance of an action to remediate the potential security threat (e.g., by generating an alert, by causing an external firewall system to block an IP address, by causing an external user identity management system to block a user, etc.). In an embodiment, the at least one action can be executed automatically in response to the triggering condition being satisfied and/or a user may further cause performance of one or more actions on an ad hoc basis.

In an embodiment, a network security application records information related to the execution of modular alerts, for example, by associating data triggering particular modular alerts (e.g., data identified by a query associated with a modular alert) with information associated with the execution of modular alert actions. For example, consider an example modular alert configured to identify instances of potential brute-force login attacks, and further configured with an action causing an external firewall application to blacklist one or more network addresses in response to identifying an attack. In this example, in response to the modular alert query identifying data indicating an instance of a potential attack, a network security application records information associated with the data indicating the potential attack, and in association further records information related to the execution of the action to blacklist one or more network addresses (e.g., information indicating when the action occurred, whether the action was successful, which external application performed the action, etc.). This ability to associate information related to the detection of security incidents with information related to the performance of actions responsive to the security incidents, for example, enables analysts and other users to obtain a more complete context with respect to execution of such modular alert actions than previously possible.

In one embodiment, a security application generates one or more graphical interfaces which, among other features, enable security analysts and other users to create and configure modular alerts and modular alert actions, to view information related to identified data triggering modular alert actions, and to view information related to execution of the modular alert actions.

In other aspects, embodiments of the invention encompass a computer apparatus and a computer-readable medium configured to carry out the foregoing.

3.1. Configuring and Reporting on Modular Alert Actions

In an embodiment, a network security application enables the creation of modular alerts, where a modular alert generally enables a network security application to actively respond to data identified by one or more queries where the data may correspond to potential security threats. For example, a network security application may be configured to actively respond to data identified by a modular alert query by sending one or more alerts, gathering more data, causing one or more external applications and/or systems to perform an action, or performing any other action. As described above, a modular alert generally comprises at least one query, a triggering condition reflected in criteria in the query, and at least one action to be performed in response to the triggering condition being satisfied. At a high level, a network security application uses a modular alert by executing the associated query based on a defined schedule, determining whether data identified by the query satisfies one or more defined triggering conditions, and causing execution of the defined actions in response to the triggering condition being satisfied.

As one example, a modular alert configured to detect potential brute-force login attacks against devices within a network may comprise a query configured to identify event data indicating that a potential brute-force login attack is occurring (e.g., event data reflecting network messages received by devices within the network). The modular alert may further comprise a triggering condition indicating that an occurrence of a potential brute-force login attack is occurring when N or more failed login attempts are received by a particular device within S seconds. One example action which may be associated with this alert is causing an email alert to be sent to a system administrator notifying the administrator of the potential threat.

The system administrator or other user may further cause various ad hoc actions to be executed based on the identified event data. For example, a user may execute one or more additional event data queries to identify network addresses of devices from which the login attempts originate. The user may further use an external security application to blacklist the network addresses, or the user send additional search requests to external applications to discover more information about the network addresses. However, if a user fails to log information related to these and other similar actions taken in response to the detection of a potential security, analysts and other users often experience difficulty or are unable to reconstruct information related to steps taken to diagnose and/or remediate a potential security threat. For example, if information relating to the performance of various incident response actions is unavailable, it is often difficult for an analyst to determine where he or she is within an investigation, for others to audit actions taken in response to a security threat, to hand off an ongoing threat investigation from one analyst to another, and generally to understand a context surrounding incident investigation and remediation processes.

In an embodiment, to facilitate responding to potential security threats and tracking related security threat investigations, a network security application as described herein further records information related to the execution of configured modular alert actions, associates the recorded information with the data triggering the modular alert, and generates various displays, dashboards, and other visualizations to display the modular alert action information in conjunction with indications of the data triggering the modular alert. Referring again to the example above of a brute-force login attack, the network security application may generate an interface displaying information related to the data triggering the modular alert (e.g., event data corresponding to failed login attempts, event data corresponding to network data received by the affected device(s), etc.), and further including information related to the performance of associated modular alert actions (e.g., additional information obtained from a query related to the affected user account, information indicating whether the network address blacklist action was successful, etc.). The ability for analysts to view information related to the performance of modular alert actions in conjunction with the identified event data triggering the actions enables a greater understanding of the entire lifespan of a security threat investigation and remediation efforts. Furthermore, the ability to customize the automation of modular alert actions improves the efficiency of security threat remediation efforts, thereby lowering the cost of security threat management.

FIG. 18 is a flow diagram illustrating an example process for configuring modular alerts and for reporting the performance of modular alert actions. The various elements of flow 1800 may be performed in a variety of systems, including systems such as system 108 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

At block 1802, input is received, through a graphical interface for creating modular alerts, defining a modular alert. In an embodiment, a modular alert comprises a query for filtering or processing events, a triggering condition reflected in criteria in the query, and an action to be executed in response to the triggering condition being satisfied during execution of the query. As indicated above, a modular alert generally represents functionality of a network security application which enables users to define a query and an associated triggering condition, and to further associate one or more actions to be performed by the network security application based on data identified by the query satisfying the triggering condition. In an embodiment, the graphical user interface may be generated by a search head 210, an indexer 206, or any other component of a data intake and query system 108.

In an embodiment, a graphical interface for creating a modular alert includes interface components which enable a user to create a query to identify data of interest and an associated triggering condition. For example, if a user desires to create a modular alert related to phishing email attacks, the user might create a query which searches for event data corresponding to received email messages, where an associated triggering condition is based on detecting that a threshold number of computing devices having received an email including an attachment matching a known signature within a specified time interval. As another example, a user desiring to create a modular alert related to denial-of-service attacks may create a query searching for event data corresponding to a particular type of network message, where an associated triggering condition is based on detecting that a threshold number of network messages have been received by any machine within a defined time interval. In general, such queries may be configured to search for any type of event data of interest such as, for example, event data related to potential occurrences of various types of network or device security threats, computing device performance issues, etc.

Figure 19:
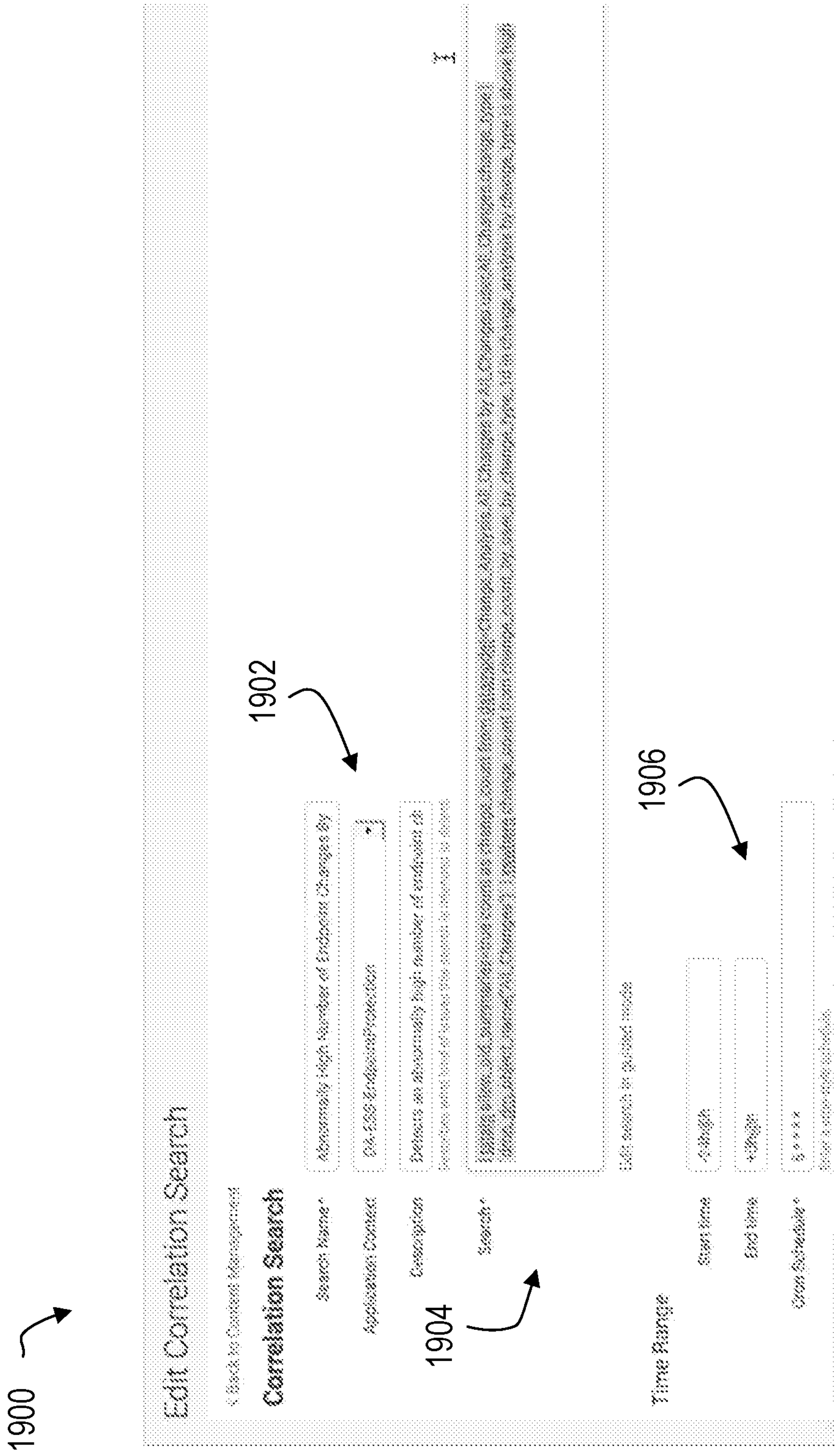
FIG. 19 illustrates a portion of an example interface including components for configuring a query to search for data related to one or more security threats in accordance with the disclosed embodiments.

FIG. 19 illustrates a portion of an example interface including components for configuring a query to search for data related to one or more security threats. For example, the components of interface 1900 include query description components 1902, a query syntax field 1904, and query scheduling components 1906.

In an embodiment, query description components 1902 include various text fields, drop-down boxes, and other interface components which enable a user to provide descriptive information about the query being configured. In FIG. 19, for example, the query description components 1902 include a text field for providing a name or label for the query, an application context with which to associate the query, and a description field for a user to provide more detailed information about the query.

In an embodiment, a query syntax field 1904 is a text field enabling a user to create a search query. In other examples, any type of interface component may be used to enable a user to specify a query including graphical query builders or other interfaces for assisting the query building process. In general, a user may use a query syntax field 1904 to specify any number of functions, arguments, and/or clauses for any type of query language supported by the network security application and which enables the application to search, filter, modify, and/or manipulate data accessible to the application. In the context of FIG. 19, for example, a user may use the query syntax field 1904 to specify a query to search for event data stored in data stores 208 of a data intake and query system 108.

In an embodiment, an interface 1900 further includes query scheduling components 1906, which enable a user to define a schedule for executing the query specified in the query syntax field 1904. For example, the query scheduling components 1906 may enable a user to define a time of day at which to start executing the query (e.g., every day at 6:00 AM), a time of day at which to stop executing the query (e.g., every day at 11:00 PM), specific days on which to execute the query (e.g., every Monday-Thursday), one or more intervals for executing the query during the scheduled times (e.g., once a second, once every half hour, once every 3 hours, etc.), etc. In an embodiment, some or all of the interface components of query description components 1902, options presented to a user to define the query in a query syntax field 1904, or any other aspects of the interface 1900 may be based on fields extracted from or available in event data to which the query relates.

In an embodiment, a graphical interface for creating modular alerts further comprises interface components to configure and associate one or more actions with the modular alert. In this context, a modular alert action broadly includes any type action which can be performed by a security application or which the security application can cause another device, application, and/or system to perform. For example, one action may involve the security application performing a search for additional data related to the identified data which triggered the modular alert. In response to a modular alert configured to identify data representing unusual network activity involving a particular endpoint device, for example, an action may be configured to search for and identify additional data related to the same endpoint device (e.g., based on searching for event data associated with a same network address, hostname, or other endpoint device identifier). The additional event data, for example, might indicate the presence of malware, unusual file activity, or other information to aid an analyst with diagnosing the underlying security incident. As another example, an action may involve the security application sending a request to an agent running on an endpoint collect the additional event data from the endpoint device, or sending instructions to the agent to perform a malware or virus scan and report the results.

In an embodiment, a modular alert action may involve causing one or more applications and/or systems external to the network security application, including external firewall applications, user identity management applications, etc., to perform an action. For example, an action may involve requesting data from one or more of the external systems related to the data triggering the associated modular alert. As another example, an action may involve sending one or more instructions to external applications and/or systems to perform one or more actions at the external applications and/or systems. The instructions sent to the one or more external entities may involve requests sent via one or more application programming interfaces (API), by accessing a web portal or other interface, or using any other mechanism to interact with the external systems.

In an embodiment, a modular alert action generally may comprise a script, code segment, or other executable logic or combinations thereof configured to perform the action. Actions may be created as a separate executable code segment and loaded into security applications. For example, a vendor associated with an external security application or system may create one or more actions that enable the network security application to interface with the external system. An example of a tool for assisting with the creation of custom modular alert actions is described herein in Section 3.4.

Figure 20A:
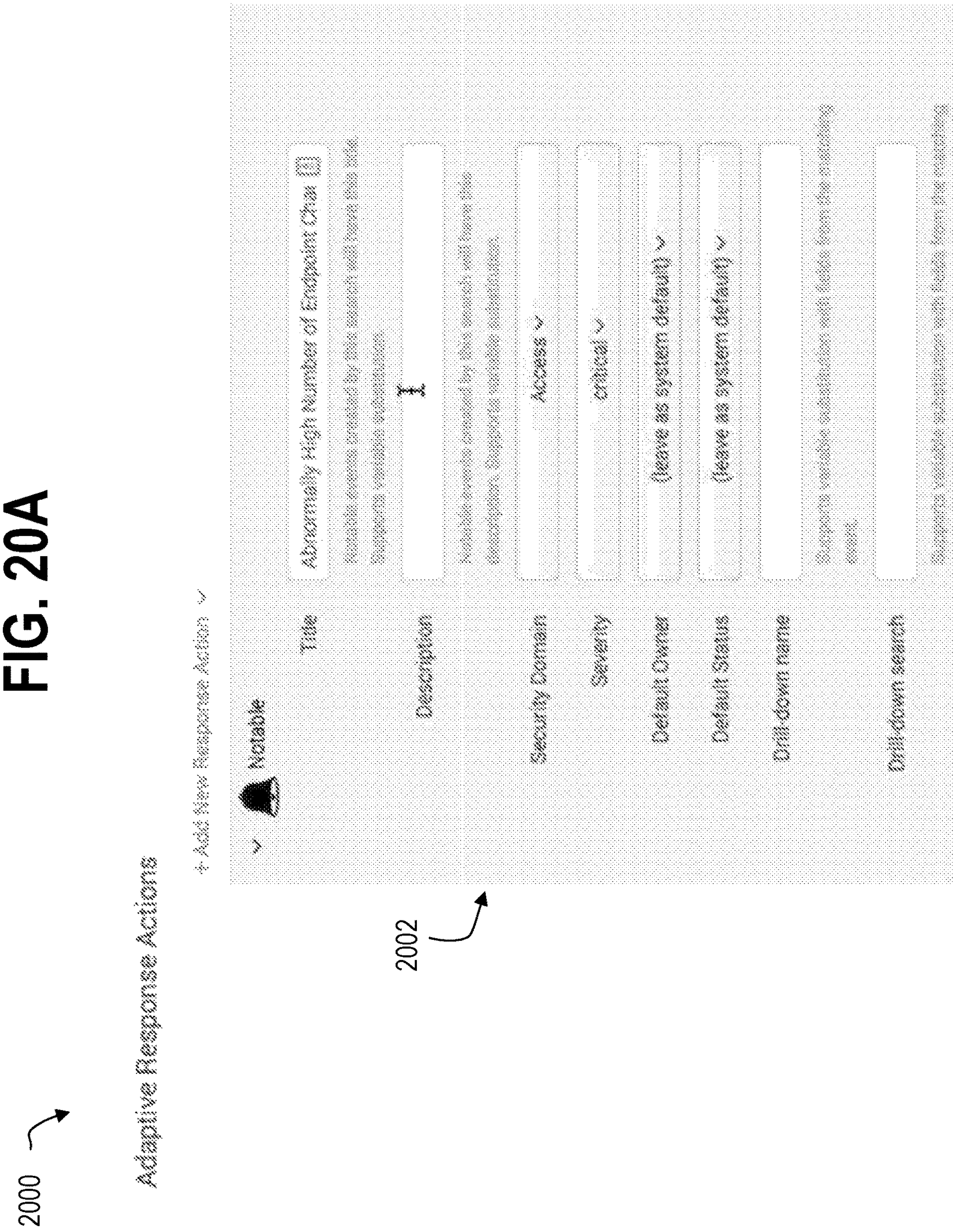
FIGS. 20A, 20B illustrate portions of an example interface including components for configuring modular alert actions in accordance with the disclosed embodiments.
Figure 20B:
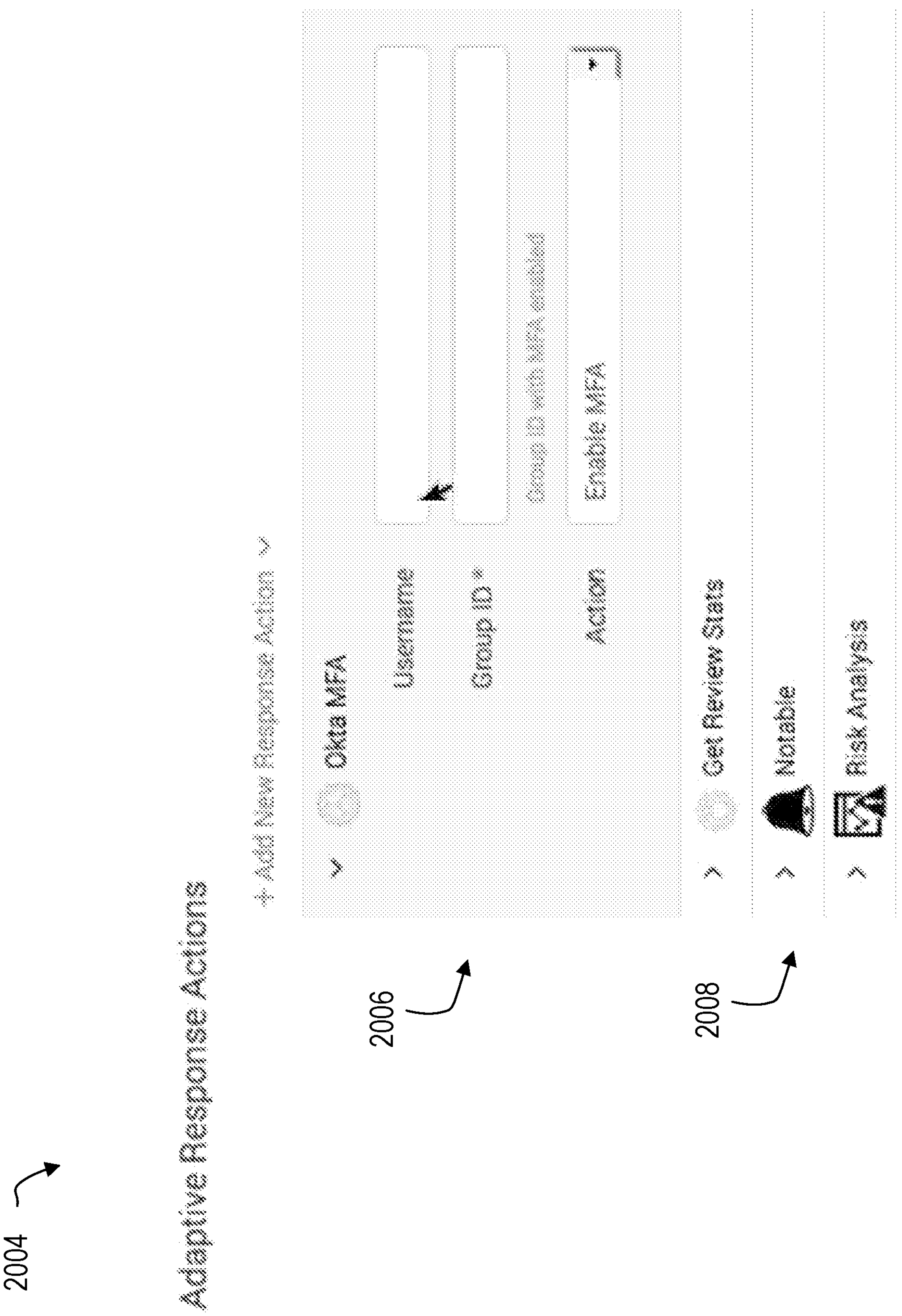

FIGS. 20A, 20B illustrate portions of an example interface including interface components for configuring modular alert actions. For example, each of the interface components in FIG. 20A and FIG. 20B may be part of or associated with a query definition interface 1900 as shown in FIG. 19 (e.g., a different section of the same interface, or a separate interface of an interface flow). Referring to FIG. 20A, an action configuration panel 2002 includes interface elements enabling a user to configure one particular type of action for association with a modular alert. In the example of FIG. 20A, the action configuration panel 2002 includes various interface components for creating an action which generates a "notable event" in response to data triggering the associated modular alert, including setting a title for the notable event, a description of the notable event, types of information to include with the notable event, etc.

FIG. 20B illustrates a portion of an example interface including components for configuring a modular alert action involving an external security application. In the example of FIG. 20B, a portion of an interface 2004 includes an action configuration panel 2006 comprising various interface elements to configure one or more actions involving an external user identity management application. For example, a query for an associated modular alert may be configured to identify data indicating instances of failed login attempts at particular devices, and a triggering condition which detects when a threshold number of failed user login attempts occur within a defined period of time. In this example, a user may use an action configuration panel 2006 to specifying actions including requesting additional information about the affected user account from an external user identity management application, sending a request to block the user account, sending a request to turn on multi-factor authentication for the user account, and so forth. Action indicators 2008 illustrate other actions that may have been previously configured for the same modular alert, and which may be further modified or deleted by interacting with the corresponding interface elements. Furthermore, a user may select an interface component (e.g., an "Add New Response Action" link) to add a new action not currently listed, where the selection of the action to add may include any action available in the network security application (e.g., any actions preconfigured by a vendor of the network security application, custom actions created by a user, custom actions created by a vendor of an external application and/or system, etc.).

Figure 21:
FIG. 21 illustrates an example interface component for specifying "next steps" actions associated with a modular alert in accordance with the disclosed embodiments.

In an embodiment, configuring a modular alert may include providing input specifying text, graphical information, and/or any other type of information which may assist an analyst or other user with responding to a security threat identified by a modular alert. For example, the information may include a description of one or more "next steps" for an analyst to perform to further diagnose and/or remediate the threat identified by the modular alert. FIG. 21 illustrates an example interface component for specifying "next steps" actions to associate with a modular alert. The interface 2100 of FIG. 21, for example, includes a next steps interface component 2102, where a user can input text description, links to actions to perform, links to other helpful information, or any other data which may assist an analyst with responding to an active modular alert. For example, the links to actions may include links which cause the automatic execution of one or more modular alert actions available in the application.

At block 1804, the modular alert is persisted in memory. For example, a network security application may store data representing the query, triggering condition, and associated actions in any type of volatile or non-volatile memory. The data may be stored in a data store 208, a separate database, or in any other form of storage.

At block 1806, the query included in the modular alert is executed. For example, the network security application may execute the query in response to creation of the modular alert and/or based on a defined execution schedule for the query, as described above in reference to block 1802. In an embodiment, executing a query may include a search head 210 searching a field-searchable data store 208, one or more external data storage systems, one or more external applications and/or systems, and/or any other data source. The execution of the query may include searching, processing, and/or filtering event data, raw machine data, log data, wire data, or any other type of data stored at the one or more data sources. In an embodiment, execution of the query may involve correlating data derived from two or more different sources, or two or more different types of data from a same data source. For example, if a particular modular alert relates to detecting instances of brute-force login attacks, one example correlation may involve searching for data indicating failed user account attempts at a particular device with other network data related to the same device recorded by the device or other system components.

In an embodiment, each instance of a query execution is associated with a first identifier, and any results from executing the query are associated with a second identifier. In various embodiments, the first identifier and the second identifier may be different identifiers, a same identifier, or the first and second identifier may be combined into a single identifier. The first identifier and/or the second identifier may be unique identifiers relative to identifiers associated with other executed queries. As described in more detail hereinafter, the association of the modular alert query and/or query results with identifiers enables the network security application to track information related to the data triggering the modular alert and to further track information related to the execution of modular alert actions by the associating the same identifier with both.

Figure 22:
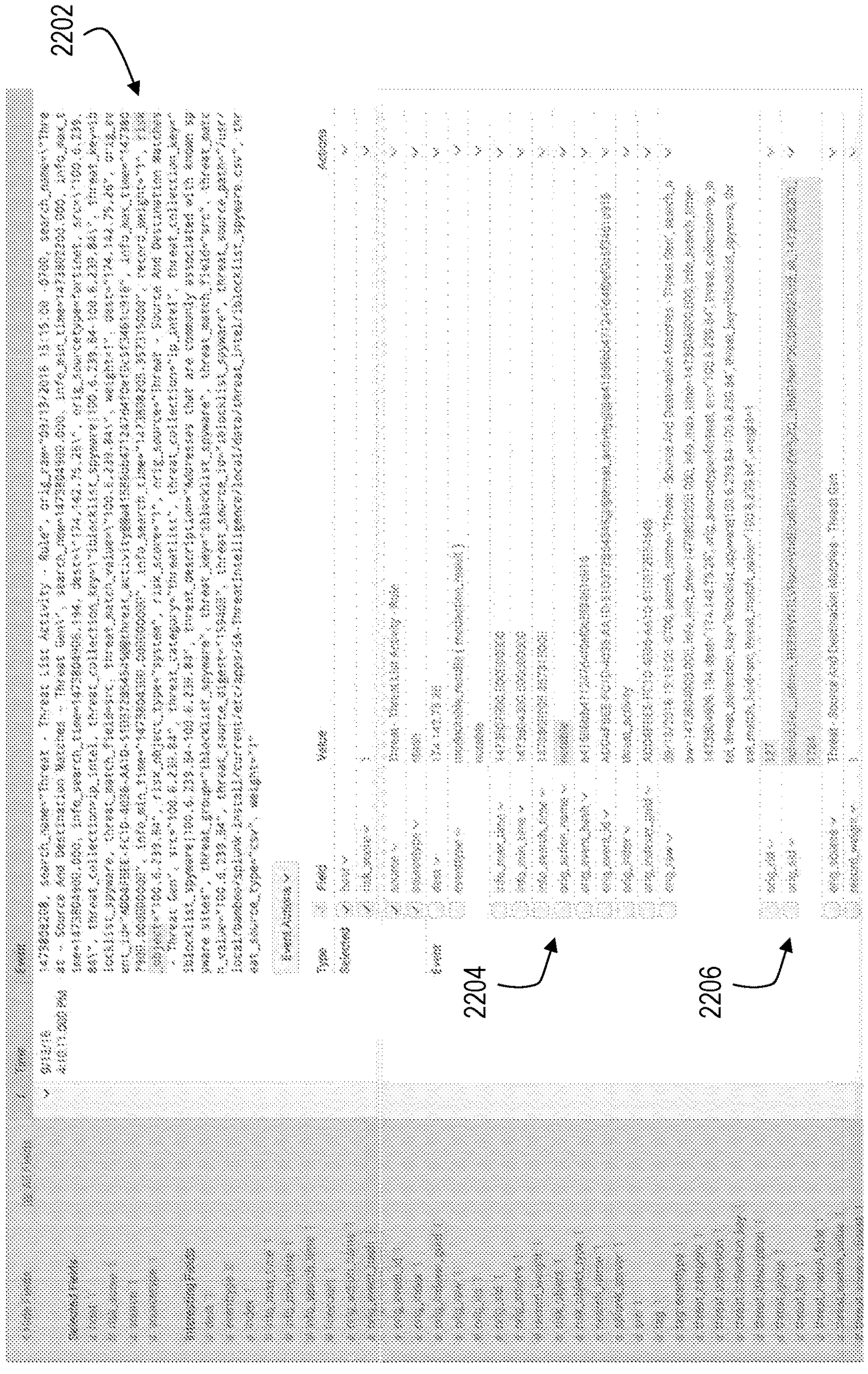
FIG. 22 illustrates an example interface displaying information related to a potential security threat identified by a modular alert in accordance with the disclosed embodiments.

FIG. 22 illustrates an example interface displaying information related to the execution of a modular alert query, including information related to data identified by the query and identifiers associated with the query and query results. For example, the interface 2200 includes event data 2202, which displays information related to event data identified by an executed modular alert query including a time stamp associated with an event and a portion of raw data associated with an event. In the example of FIG. 22, the interface 2200 further includes various information related to the query and associated results, including a result type 2204 (e.g., indicating that the displayed event corresponds to a "notable" event) and identifiers 2206 (e.g., displaying identifiers associated with the instance of the query generating the results data, and a second identifier associated with the query results).

At block 1808, the triggering condition in the modular alert is detected. For example, the network security application executing the query may analyze data identified in response to execution of the query and determine whether the data satisfies the triggering condition. The triggering condition, for example, may indicate a threshold number of results matching defined criteria, one or more threshold time periods, types of data contained in the results, or any other conditions or combinations thereof. A search head 210, for example, may monitor query results to determine if and when the data satisfies an associated triggering condition.

At block 1810, based on detecting the triggering condition, the action in the modular alert is executed. For example, a search head 210 or other component of a data intake and query system 108 may perform or cause performance of one or more actions defined in the modular alert. As described above in reference to block 1802, a security application executing an action may comprise executing one or more scripts, code segments, or other executable logic for performing one or more operations with respect to data stored by a data intake and query system 108, data stored by an external data storage system, or for causing another application, device, or system to perform one or more operations.

In an embodiment, an action may be performed directly in response to a network security application detecting that a modular alert triggering condition is satisfied, and/or one or more actions may be performed asynchronously with respect to detection of the triggering condition. For example, in response to a triggering condition indicating an occurrence of malware potentially present on a particular endpoint device, a search action may be performed directly in response to detection of the triggering condition to identify additional information about the endpoint device (e.g., the search may locate data indicating recent emails received by the device, recent file system changes, etc.).

As an example of performing an asynchronous action, a triggering condition for a particular modular alert may detect when a threshold number of devices suddenly start sending requests to one or more particular websites. In this example, an associated action may send to an external security application a request to perform a scan against the websites to determine whether any of the websites are known to host malicious software. In this example, the information from the scan performed by the external application may be returned to the network security application at some undetermined time in the future relative to when the triggering condition was detected. As described in more detail in reference to block 1812, in each of the instances, information associated with the performance of either synchronous and asynchronous actions may be associated with the modular alert causing performance of the actions based on one or more common identifiers, thereby enabling display of the information together in one or more graphical interfaces or other displays.

Figure 23:
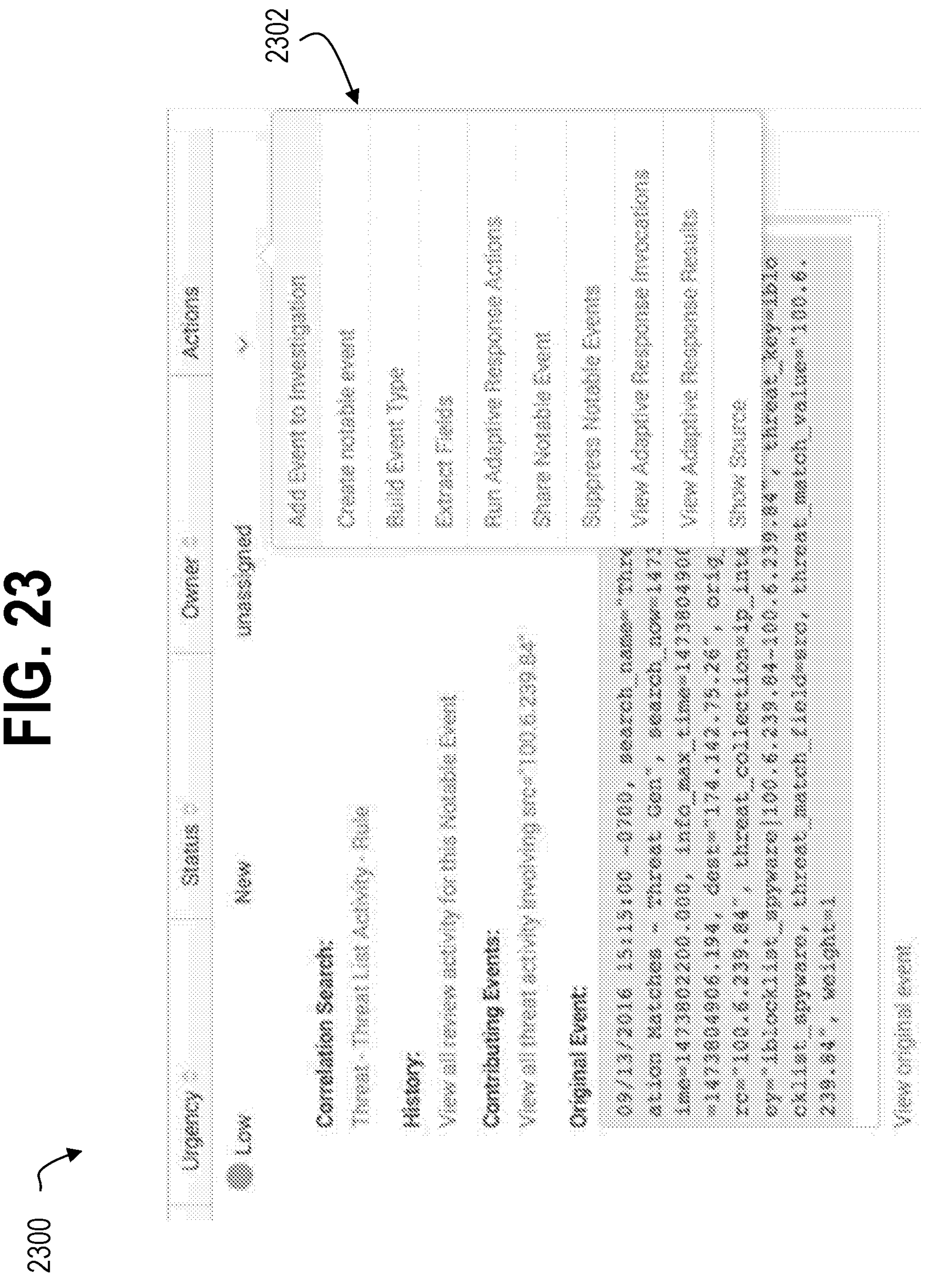
FIG. 23 illustrates a portion of an example interface displaying components enabling ad hoc execution of modular alert actions in accordance with the disclosed embodiments.

In an embodiment, in addition to the performance of automated modular alert actions, a network security application may further enable an analyst or other user to execute actions on an ad hoc basis. FIG. 23 illustrates a portion of an example interface including components enabling users to execute modular alert actions on an ad hoc basis. In FIG. 23, for example, an interface 2300 includes an actions panel 2302, including various selectable options relevant to a security incident displayed in the interface 2300. For example, the actions panel 2302 includes options to add the associated event(s) to an investigation, to create a notable event, to execute one or more modular alert actions, to share a notable event, among other options. In other examples, other interfaces or mechanisms may be used to manually execute any action with respect to data identified by a modular alert query.

In an embodiment, depending on a configuration of the associated modular alert, any number of actions can be executed based on detecting the triggering condition. For example, as illustrated with respect to FIGS. 20A-20B, a single modular alert may be associated with actions for creating a notable event, executing one or more additional search queries, interacting with one or more external applications and/or system, and so forth. Each of the actions may be performed in parallel with one another, or in any order with respect to other actions.

At block 1812, information associated with execution of the action is collected. For example, a search head 210 or other component of a data intake and query system 108 may collect various types of information related to the execution of the modular alert action(s). In an embodiment, collecting the information associated with execution of the action may include associating the information with a same identifier used to identify the modular alert, modular alert query, and/or modular alert query results. In this manner, the identifier subsequently can be used to generate various dashboards, visualizations, or other displays of information related to both the modular alert query data and to the information associated with execution of the action(s).

In an embodiment, information associated with execution of an action may include, but is not limited to, a time at which the action was executed, a user associated with the action (or a default user if the action was performed automatically), an indication of the success of the action, additional data obtained based on a search associated with the action, or any other information associated with the action execution. For example, if an action includes the network security application executing a query for additional information about the data triggering the associated modular alert, the information associated with execution of the action may include the results of the search, a time the search was conducted, a number of search results, etc. In this instance, the collected information may include information collected from a data store of the data intake and query system 108, or from one or more external data storage systems from which the data was identified.

As another example, if an action includes sending a command to an external firewall application to blacklist a network address, information associated with the execution of the action may include when the command was sent, whether confirmation of the command was received from the external firewall application, whether the firewall application successfully performed the command, and so forth. In this instance, the collected information may include information requested from an external application, data sent automatically from an external application, and/or data recorded by the network security application during the interactions with the external application. In general, any information accessible to the network security application and associated with the execution of the action(s) may be collected and associated with the modular alert.

At block 1814, the collected information associated with execution of the action is caused to be reported. In an embodiment, causing the collected information to be reported may include generating one or more interfaces displaying the information, generating and sending one or more alert messages or notifications, or any other reporting. For example, a search head 210 or other component of a data intake and query system 108 may generate and cause display of the interfaces, where the information displayed in the interfaces may be identified based on data associated with a modular alert query and data associated with execution of one or more actions having one or more same identifiers, as described above.

Figure 24:
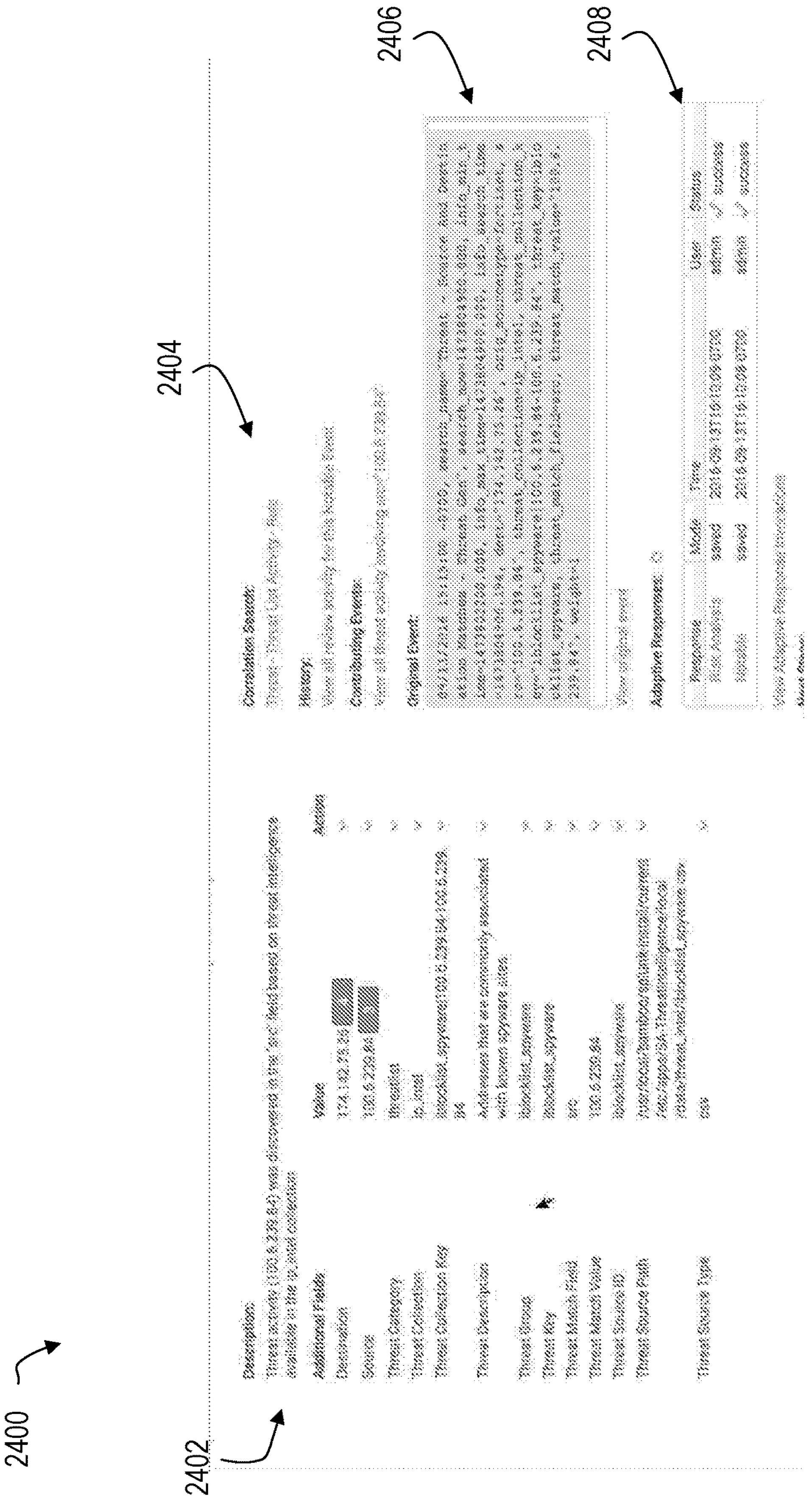
FIG. 24 illustrates an example interface displaying information related to an identified security incident, and further displaying information related to associated modular alert actions in accordance with disclosed embodiments.

FIG. 24 illustrates an example interface displaying information related to a security incident identified by a modular alert, and further displaying information related to associated modular alert actions. In FIG. 24, an interface 2400 includes incident data panel 2402, additional information links 2404, event data display 2406, and a modular alert action panel 2408.

In an embodiment, an incident data panel 2402 includes various information related to the data which triggered the associated modular alert. For example, an incident data panel may include information about the type of security threat associated with the incident, source and destination network address information related to affected devices, and other general information related to the incident. The information displayed in the incident data panel 2402 may include information obtained or derived from the events triggering the modular alert, from other data obtained in response to triggering the modular alert, obtained from one or more external security application and/or systems, and/or from any other source.

In an embodiment, an interface 2400 further includes additional information links 2404, which enable a user to navigate to other interfaces which display additional information related to the query which triggered the modular alert (e.g., to modify the query, to view additional information about event data identified by the query, etc.), display additional information about past event data which triggered the same modular alert, display more detailed information about each of the individual events which triggered the modular alert, or any other information related to the modular alert.

In an embodiment, an event data display 2406 displays information from at least one of the events which triggered the modular alert. For example, the event data display 2406 may display some or all of the raw machine data associated with the event, field information associated with the time, time stamp information, and/or any other event information.

In an embodiment, the interface 2400 further includes modular alert action panel 2408. In FIG. 24, for example, a modular alerts action panel 2408 includes information related to the performance of two separate actions, one action corresponding to a "risk analysis" action, and a second action corresponding to the creation of a notable event. In the example of FIG. 24, the "risk analysis" action, for example, may have involved a search for additional data related to the displayed incident, causing an external device to perform an action to further investigate the risk, etc. Similarly, a notable event action may have involved the network security application generating a notable event based on event data identified by the query associated with the modular alert.

As illustrated in FIG. 24, a modular alerts action panel 2408 may include the display of information related to the execution of the modular alert actions, including a name or label associated with each action, a time at which the action was performed, a user associated with performance of the action, and an indication of whether performance of the action was successful or not. A user associated with the performance of each action may include a default user associated with the performance of automated actions (e.g., an "admin" user), or may specify an actual user causing the execution of one or more ad hoc actions. In an embodiment, each of the actions displayed in the modular alert action panel 2408 may include a hyperlink to another interface displaying more detailed information related to the performance of the respective action. For example, the more detailed information may include displaying details of information obtained by the action, timing information relate to the action execution, etc.

3.2. Adaptive Response Orchestration

As described above, a network security application may enable analysts and other users to create modular alerts, which can be configured to cause various actions to be executed in response to a network security application identifying potential security threats. For example, a user may create a modular alert by specifying a query including a triggering condition, and indicating one or more actions to be executed in response to data identified by the query satisfying the triggering condition. These actions may be performed automatically in response to the detection of the triggering condition, thereby automating any number of tasks which otherwise may have been manually performed by an analyst or other user in a more time consuming manner.

In an embodiment, in addition to enabling the execution of actions in response to satisfying a triggering condition of a modular alert, the execution of actions may be further "orchestrated" by the network security application. At a high level, orchestrating modular alert actions may include by causing additional actions to be performed based on information associated with the execution of the initial actions, thereby enabling actions to be "chained" off of one another.

For example, a first action performed in response to triggering a particular modular alert may include a search which returns information indicating a network address from which a network-based attack appears to originate. In this example, a second action may be configured to execute based at least in part on the information returned by the first action. For example, the network security application may issue a request to an external security application requesting more information about the network address identified by the first action to determine whether the network address is an address associated with known attackers. As a further example, a third action may be configured, if the security application indicates that the network address is associated with a known attacker, to send a command to an external firewall application to block any future traffic originating from the network address, and so forth. Any number of separate actions may be chained off of each preceding action, and a chain of actions may be of any length. In this manner, more sophisticated and automated modular alert actions can be configured based on the modular alert functionality described herein.

3.3. Interactive Electronic Runbooks

As described above in Section 3.1, a network security application may include various graphical interfaces for creating modular alerts, displaying information related to data identified by modular alerts and related to the execution of any corresponding modular alert actions, and for creating and displaying information related to "next steps" to be performed by an analyst or other user (e.g., as illustrated in FIG. 21). In an embodiment, one type of next steps information may include displaying an interactive electronic runbook. At a high level, a runbook is a compilation of procedures and operations that a user carries out to diagnose and/or remediate an issue related to one or more computing devices. In one embodiment, a runbook may be implemented as an interactive electronic runbook and included as part of a modular alerts interface.

In one embodiment, an electronic runbook comprises one or more interface components which guide an analyst or other user through a series of steps for diagnosing and/or remediating a security incident identified by a corresponding modular alert. In other examples, an electronic runbook may be displayed and used in connection with other types of alerts, dashboards, searches, or any other interface of a network security application. The series of steps may be displayed using various types of interface components forming a graph, where each node of the graph includes information about one or more steps to perform at that stage in the runbook. For example, one particular step may indicate one or more queries for an analyst to execute to obtain additional information about the security threat. Depending on the results of the queries, the user may select from one or more possible next runbook steps to determine a next step to perform in the remediation process. The interface may further include various components enabling a user to record information about the user's performance of each step.

In an embodiment, the performance of actions at each step of an electronic runbook process may include recording information in association with the modular alert. For example, similar to collecting information related the execution of modular alert actions, as described at block 1812 of FIG. 18, any information related to the performance of actions with respect to a step of an interactive runbook may be associated with a corresponding modular alert using a same identifier or other mechanism. In this manner, information performed by an analyst based on an interactive runbook may also be displayed in various interfaces in conjunction with modular alert and modular alert action information.

Figure 25:
FIG. 25 illustrates an example interface displaying an interactive electronic runbook in accordance with the disclosed embodiments.

FIG. 25 illustrates an example interface displaying an interactive electronic runbook. In FIG. 25, for example, an interface 2500 includes an incident information display 2502 and an electronic runbook 2504, including runbook step information panel 2506. The incident information display 2502 displays various types of information about a particular security threat identified by a modular alert including, for example, a name of the correlation search identifying the security threat, an indication of the underlying event data, and information about the performance of actions associated with the modular alert.

In an embodiment, an interface 2500 further includes an electronic runbook 2504, which includes the display of several nodes in a tree format, where each node represents a step in a runbook procedure. In this example, assuming the associated modular alert identified an occurrence of a potential user account security threat, the electronic runbook 2504 might display guided steps which enable an analyst to diagnose the security threat. For example, the runbook step information panel 2506 includes instructions for an analyst to "Ping destination host and test if it is still reachable" to determine whether a device associated with the threat is still reachable over a network. In response to performing the action, an analyst or other user may record information about the action (e.g., to indicate how the user issued the ping command) and/or the user may select one or more interface components to indicate the results of performing the action (e.g., to indicate that the machine responded to the ping message, the machine was unreachable, or the status is unknown). Depending on the selection of a particular results indication, the interactive electronic runbook may cause display of an appropriate next step in the electronic runbook 2504 display, including changing a color coding of the nodes representing steps in the runbook, and updating the information displayed in the runbook step information panel 2506.

The use of an interactive electronic runbook as illustrated by FIG. 25 enables, among other features, an analyst or other user to perform a series of guided actions, steps, and/or procedures to diagnose and/or remediate various types of security threats. The ability to guide analysts in this manner enables less experienced analysts to perform tasks the analysts may not otherwise have the knowledge to perform. Furthermore, a graphical interface for performing the electronic runbook procedures, as illustrated by FIG. 25, enables a network security application to store information associated with the performance of steps in the runbook with the associated security incident. This information may be used to more easily audit the performance of security investigations, efficiently pass off security investigations to other analysts, and to view a richer context of an entire investigation in various graphical interfaces.

3.4. Modular Alert Action Builder

As described above in Section 3.1, a security application including modular alert functionality generally enables the performance of any type of action in response to detecting a triggering condition associated with the modular alert. The types of actions that may be performed include actions performed by the security application, but also actions performed at or involving external systems and applications. For example, actions may be created which interact with external systems and applications via application programming interfaces (APIs) or other interfaces. The creation of the actions thus requires the creation of scripts, code segments, or other executable logic that is configured to interface with such external systems and applications.

To enable users to more easily create modular alert actions for any type of internal or external system and/or application relative to the network security application, in an embodiment, the network security application includes interfaces which enable users to create custom actions for inclusion in modular alerts, the interfaces collectively referred to herein as a modular alert action builder. In this context, a modular alert action builder enables users to include functionality related to any other internal or external applications and/or systems as part of a reusable modular alert action. For example, a vendor of a separate firewall application may create one or more actions for interfacing with the vendor's firewall application to enable modular alerts to obtain information from the firewall application, to send commands to the firewall application, or perform any other action with respect to the external application.

In an embodiment, a modular alert action builder provides various built-in functions and other code templates that enable users to more easily and consistently build modular alert actions. For example, built-in functions may include functions for obtaining information about a notable event that triggered execution of the action, a function to this information obtained from an external source as a result of an API call (e.g., and which automatically associates the returned info with the appropriate identifiers). As another example, helper functions may include functionality to create event data based on actions and to send the event data to an indexer for storage in association with a corresponding modular alert, or to perform any other preconfigured functionality.

FIGS. 26A-26E illustrate example interfaces which assist with creation of custom modular alert actions. The interfaces illustrated in FIGS. 26A-26E are provided only for illustrative purposes; other interface flows and mechanisms can be used to assist a user with creating actions for association with modular alerts.

Figure 26A:
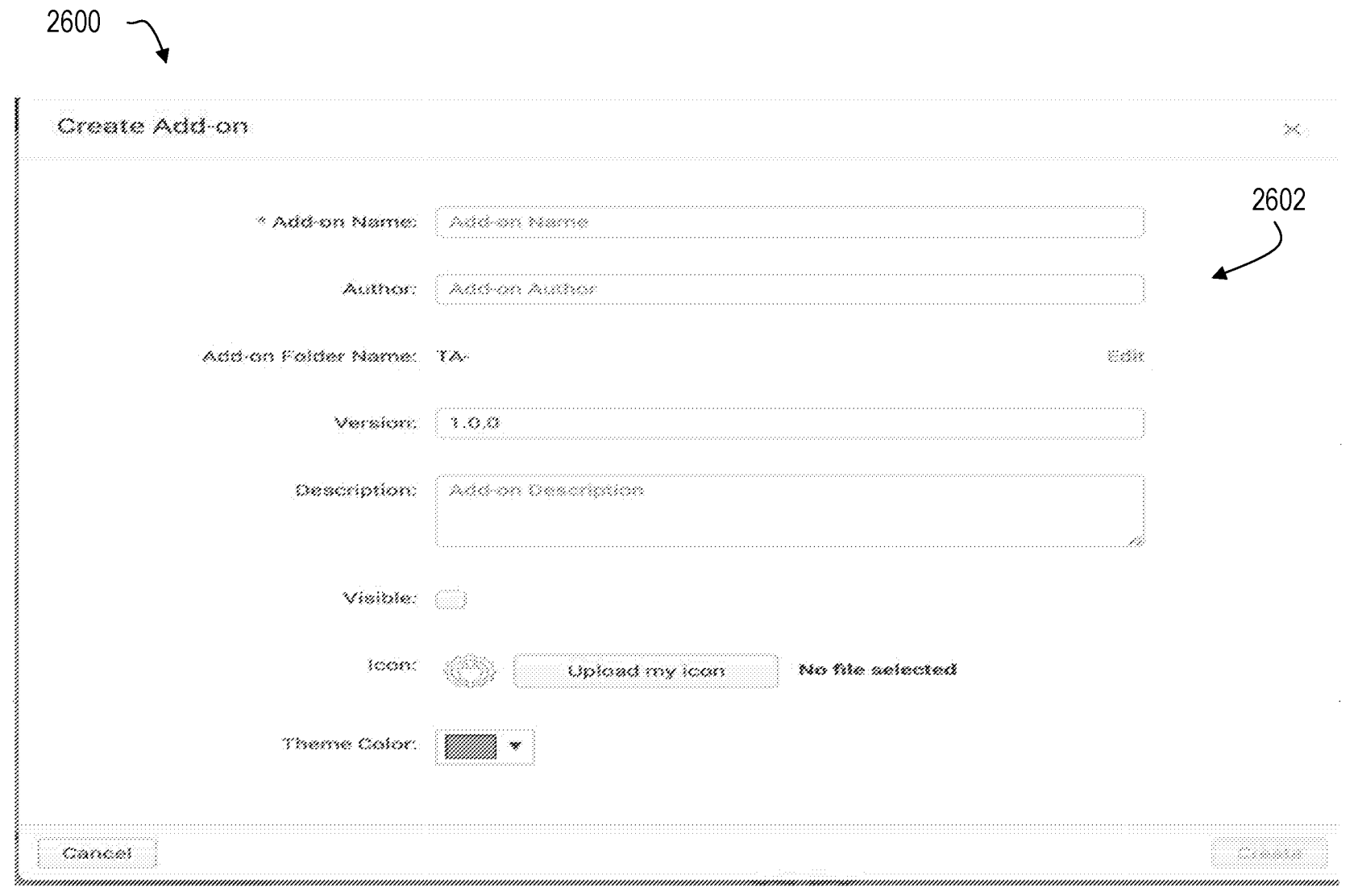
FIGS. 26A-26E illustrate example interfaces which assist with creation of custom modular alert actions in accordance with the disclosed embodiments.

FIG. 26A, for example, illustrates an example interface 2600 for specifying basic descriptive information about a modular alert action under development. For example, various input interface components 2602 enable a user to specify a name for the modular alert action, identify an author of the action, specify a version number for the action, add general description about the action, and associate an icon and theme color with the action. This descriptive information, for example, may be used to display indications of the modular alert action in various other interfaces such as the modular alert action selection interfaces illustrated in FIGS. 20A-20B.

Figure 26B:
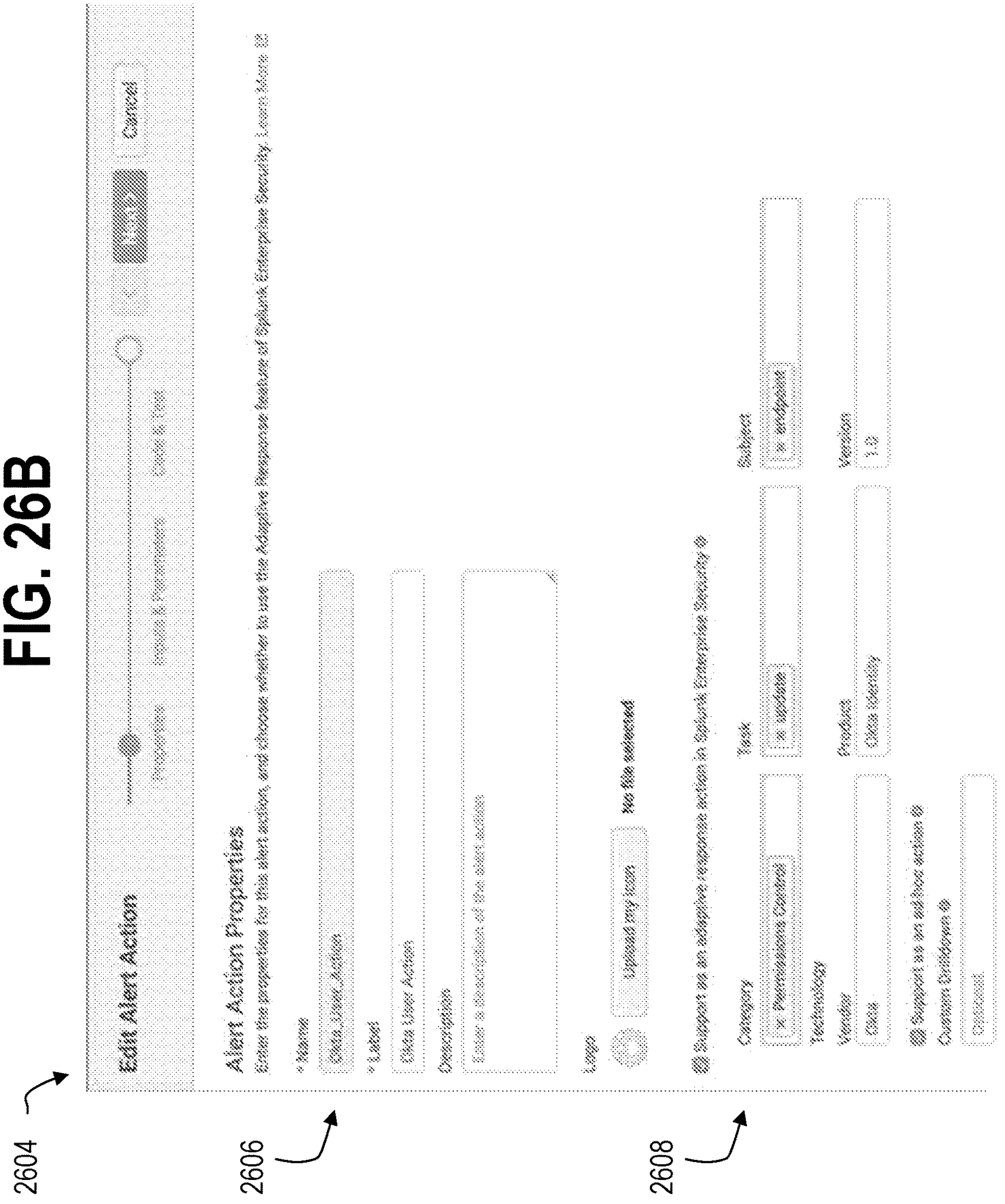

FIG. 26B illustrates an example interface 2604 which enables a user to specify various properties to associate with a modular alert action under development. For example, the interface components 2606 may enable a user to confirm, modify, or add basic descriptive information to associate with the action. The interface components 2608 enable a user to specify additional property information to associate with the action, including a category to identify the type of action, a type of task performed by the action, a subject of the action, a vendor, product, and version associated with performance of the action, among other property information.

Figure 26C:
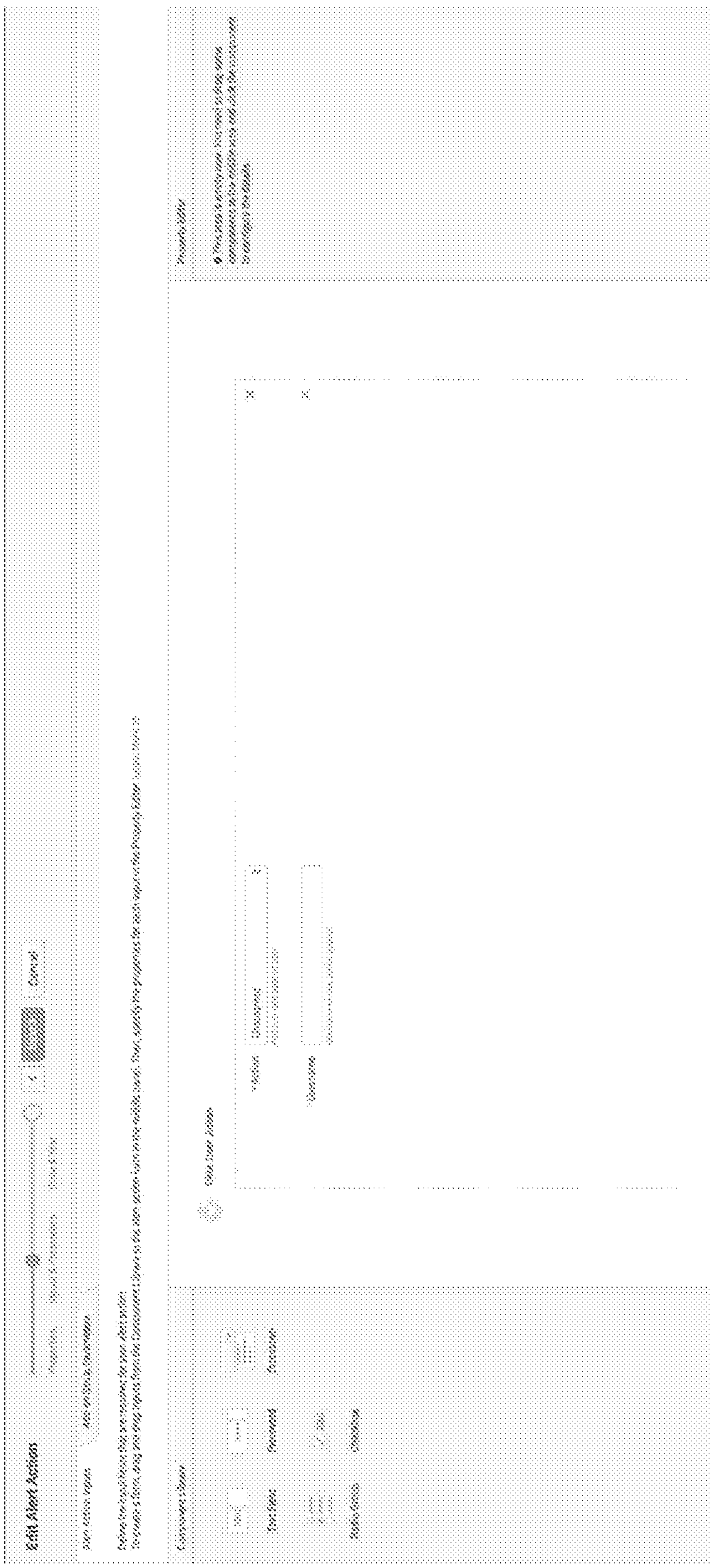

FIG. 26C illustrates an example interface 2610 which includes interface components 2612 enabling a user to add, modify, and delete various input fields associated with the modular alert action under development. For example, execution of an action may involve receiving input from the user or other source to perform the action (e.g., user account credentials, action parameters or options, etc.). The interface components 2612 may enable a user to configure the various types of input sources and actions used to execute the associated action.

Figure 26D:
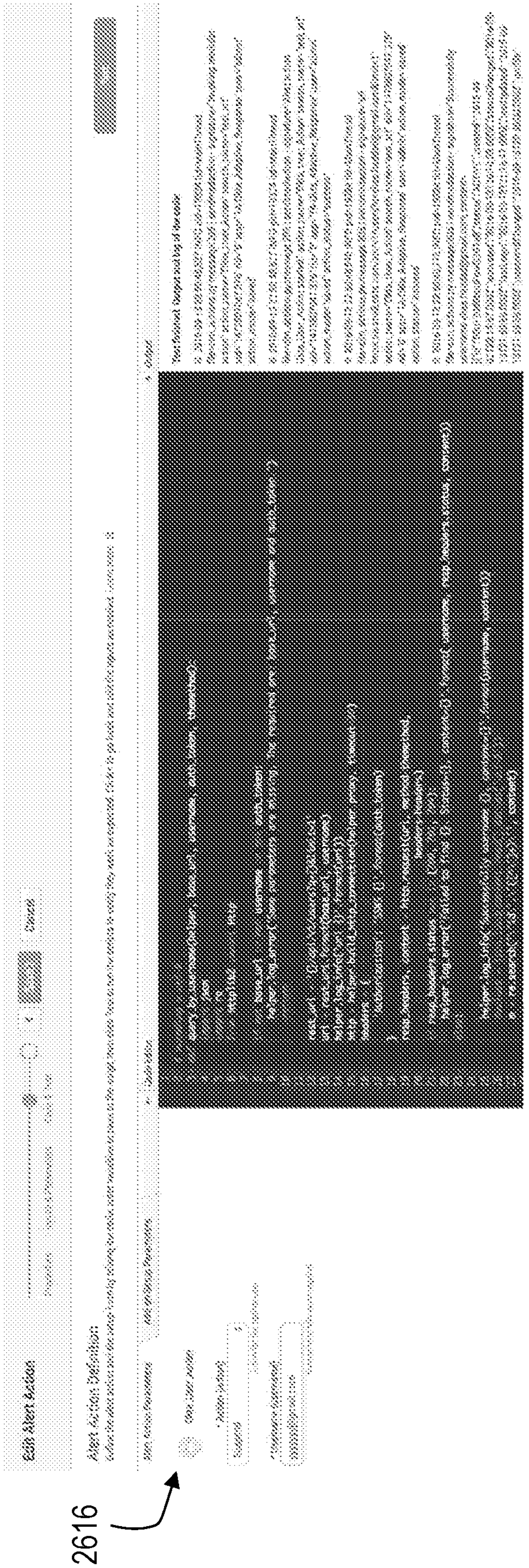

FIG. 26D illustrates an example interface 2614 which enables a user to define the logic for performance of the modular alert action. For example, the definition of the logic may include the specifying code to interact with event data, external application(s), or other components involved in the performance of the action. The interface includes an editing panel 2616, where a user can configure alert action parameters, add code to perform the action, and view output generated based on testing of the action code. The interface components for writing the code may provide access to various helper functions (e.g., to access event data, create event data, write event, create log info, perform preconfigured actions, etc.).

Figure 26E:
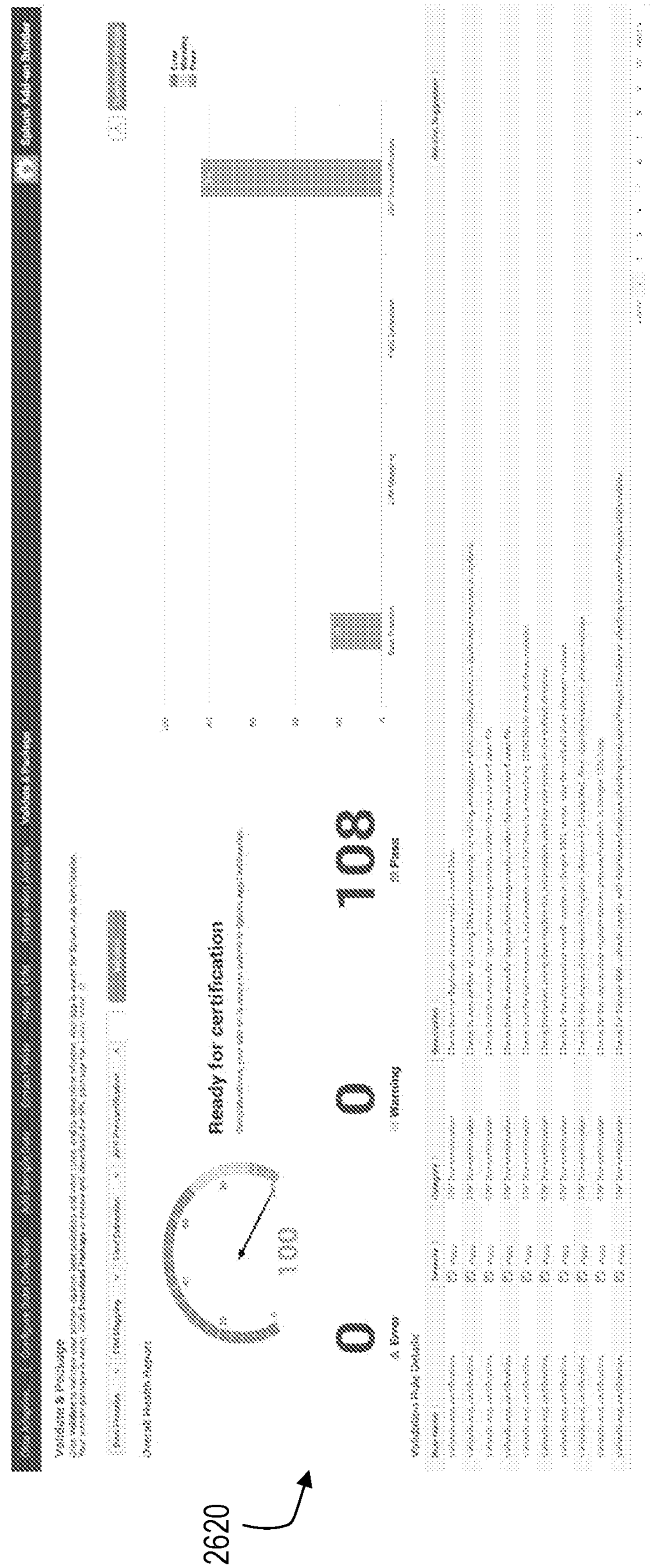

FIG. 26E illustrates an interface for validating a modular alert action created using the interfaces illustrated in FIGS. 26A-26D. For example, the interface 2618 includes various interface components 2620 to validate the modular alert action. In one embodiment, the network security application may generate a "package" containing the executable logic for the modular alert action, and send the package to an API or other component to determine whether the package conforms to various standards for executing actions within the security application. If the package passes validation in FIG. 26E, for example, the package containing the executable logic for the action can be downloaded and applied to any instance of the security application. In an embodiment, the application of a modular alert action package to an instance of a security application enables the one or more actions specified in the package to be selected as modular alert actions for created modular alerts.

4.0. EXAMPLE EMBODIMENTS

Examples of some embodiments are represented, without limitation, in the following clauses:

In an embodiment, a method or non-transitory computer readable medium comprises: receiving, through a graphical interface for creating modular alerts, input defining a modular alert comprising: a query for filtering or processing events, wherein an event includes a time-stamp and a portion of raw machine data produced by a component of an information technology or security environment and reflecting activity in the information technology or security environment; a triggering condition reflected in criteria in the query; and an action to be executed based on the triggering condition being satisfied during execution of the query; persisting the modular alert in memory; executing the query included in the modular alert; detecting the triggering condition in the modular alert; based on detecting the triggering condition, executing the action in the modular alert; collecting information associated with execution of the action; and causing reporting of the information associated with execution of the action.

In an embodiment, a method or non-transitory computer readable medium comprises: wherein the query is executed periodically.

In an embodiment, a method or non-transitory computer readable medium comprises: wherein the modular alert further comprises a defined schedule for executing the query.

In an embodiment, a method or non-transitory computer readable medium comprises: wherein the triggering condition represents detection of a security threat including one or more of: a malware infection, a brute-force login attack, a denial-of-service attack, a phishing attack.

In an embodiment, a method or non-transitory computer readable medium comprises: wherein the triggering condition represents detection of a security threat, and wherein the action includes identifying data from a data store related to the detected security threat to obtain additional information about the security threat.

In an embodiment, a method or non-transitory computer readable medium comprises: wherein the action includes causing an external security application to perform an action.

In an embodiment, a method or non-transitory computer readable medium comprises: wherein the action includes causing an external security application to perform an action, wherein the external security application is one or more of: a firewall application, a user identity management application, and an antivirus and malware protection application.

In an embodiment, a method or non-transitory computer readable medium comprises: wherein the action includes causing an external security application to perform one of more of: block a user, blacklist a network address or range of network addresses, configure multi-factor authentication for a user, execute a malware or virus scan.

In an embodiment, a method or non-transitory computer readable medium comprises: wherein persisting the modular alert in memory includes storing an association between the triggering condition and the action to be executed when the triggering condition is satisfied during execution of the query.

In an embodiment, a method or non-transitory computer readable medium comprises: wherein detecting the triggering condition in the modular alert comprises identifying events in a data store comprising data that satisfies the triggering condition, wherein an indication of the data and the information associated with execution of the action is displayed on a same graphical user interface.

In an embodiment, a method or non-transitory computer readable medium comprises: wherein the query is associated with an identifier, and wherein the information associated with execution of the action is associated with a same identifier.

In an embodiment, a method or non-transitory computer readable medium comprises: wherein the query is associated with an identifier, and wherein the information associated with execution of the action is associated with a same identifier, and wherein causing reporting of the information associated with execution of the action is based on displaying information having the same identifier.

In an embodiment, a method or non-transitory computer readable medium comprises: wherein the action includes displaying an interactive electronic runbook, the interactive electronic runbook including instructions for remediating a security threat associated with the triggering condition.

In an embodiment, a method or non-transitory computer readable medium comprises: wherein executing the query comprises searching a field-searchable data store storing a plurality of events.

In an embodiment, a method or non-transitory computer readable medium comprises: wherein executing the query included in the modular alert comprises searching a field-searchable data store storing a plurality of events, and wherein each event of the plurality of events includes a time stamp and a portion of raw machine data created by a component in an information technology or security environment.

In an embodiment, a method or non-transitory computer readable medium comprises: wherein causing reporting of the information associated with execution of the action includes displaying an indication of whether the action was successful.

In an embodiment, a method or non-transitory computer readable medium comprises: wherein causing reporting of the information associated with execution of the action includes displaying a hyperlink to a separate display including detailed information about the performance of the action.

Other examples of these and other embodiments are found throughout this disclosure.

5.0. IMPLEMENTATION MECHANISM-HARDWARE OVERVIEW

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 27:
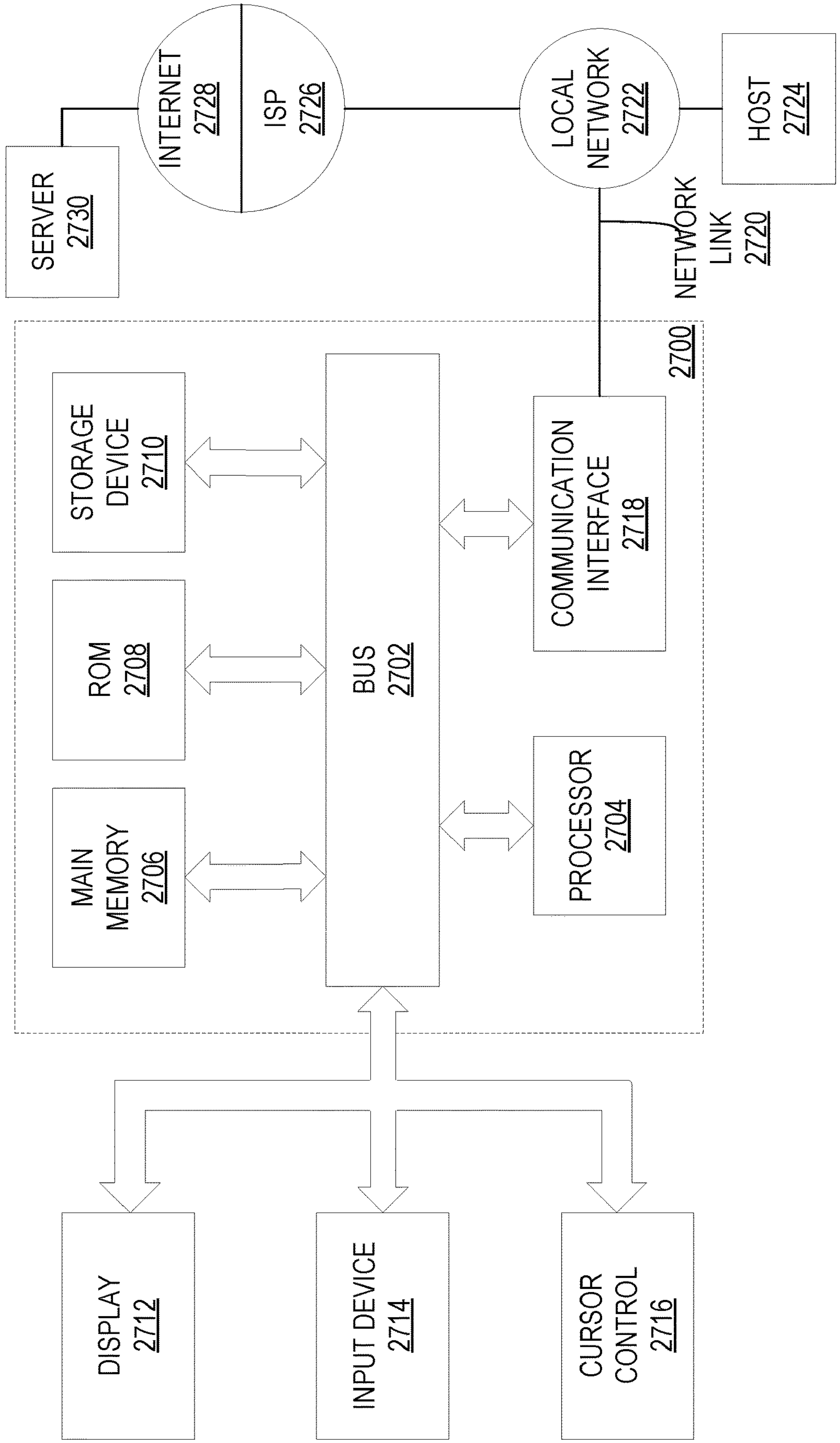
FIG. 27 illustrates a computer system upon which an embodiment may be implemented.

FIG. 27 is a block diagram that illustrates a computer system 2700 utilized in implementing the above-described techniques, according to an embodiment. Computer system 2700 may be, for example, a desktop computing device, laptop computing device, tablet, smartphone, server appliance, computing mainframe, multimedia device, handheld device, networking apparatus, or any other suitable device.

Computer system 2700 includes one or more busses 2702 or other communication mechanism for communicating information, and one or more hardware processors 2704 coupled with busses 2702 for processing information. Hardware processors 2704 may be, for example, general purpose microprocessors. Busses 2702 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 2700 also includes a main memory 2706, such as a random access memory (RAM) or other dynamic or volatile storage device, coupled to bus 2702 for storing information and instructions to be executed by processor 2704. Main memory 2706 also may be used for storing temporary variables or other intermediate information during execution of instructions to be executed by processor 2704. Such instructions, when stored in non-transitory storage media accessible to processor 2704, render computer system 2700 a special-purpose machine that is customized to perform the operations specified in the instructions.

Computer system 2700 further includes one or more read only memories (ROM) 2708 or other static storage devices coupled to bus 2702 for storing static information and instructions for processor 2704. One or more storage devices 2710, such as a solid-state drive (SSD), magnetic disk, optical disk, or other suitable non-volatile storage device, is provided and coupled to bus 2702 for storing information and instructions.

Computer system 2700 may be coupled via bus 2702 to one or more displays 2712 for presenting information to a computer user. For instance, computer system 2700 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 2712 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 2712.

One or more input devices 2714 are coupled to bus 2702 for communicating information and command selections to processor 2704. One example of an input device 2714 is a keyboard, including alphanumeric and other keys. Another type of user input device 2714 is cursor control 2716, such as a mouse, a trackball, or cursor direction keys for communicating direction information and command selections to processor 2704 and for controlling cursor movement on display 2712. This input device typically has two degrees of freedom in two axes, a first axis (e.g., x) and a second axis (e.g., y), that allows the device to specify positions in a plane. Yet other examples of suitable input devices 2714 include a touch-screen panel affixed to a display 2712, cameras, microphones, accelerometers, motion detectors, and/or other sensors. In an embodiment, a network-based input device 2714 may be utilized. In such an embodiment, user input and/or other information or commands may be relayed via routers and/or switches on a Local Area Network (LAN) or other suitable shared network, or via a peer-to-peer network, from the input device 2714 to a network link 2720 on the computer system 2700.

A computer system 2700 may implement techniques described herein using customized hard-wired logic, one or more ASICs or FPGAs, firmware and/or program logic which in combination with the computer system causes or programs computer system 2700 to be a special-purpose machine. According to one embodiment, the techniques herein are performed by computer system 2700 in response to processor 2704 executing one or more sequences of one or more instructions contained in main memory 2706. Such instructions may be read into main memory 2706 from another storage medium, such as storage device 2710. Execution of the sequences of instructions contained in main memory 2706 causes processor 2704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 2710. Volatile media includes dynamic memory, such as main memory 2706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2702. Transmission media can also take the form of acoustic or light waves, such as those generated during radio-wave and infra-red data communications.

Various forms of media may be involved in carrying one or more sequences of one or more instructions to processor 2704 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 2700 can receive the data on the network and demodulate the signal to decode the transmitted instructions. Appropriate circuitry can then place the data on bus 2702. Bus 2702 carries the data to main memory 2706, from which processor 2704 retrieves and executes the instructions. The instructions received by main memory 2706 may optionally be stored on storage device 2710 either before or after execution by processor 2704.

A computer system 2700 may also include, in an embodiment, one or more communication interfaces 2718 coupled to bus 2702. A communication interface 2718 provides a data communication coupling, typically two-way, to a network link 2720 that is connected to a local network 2722. For example, a communication interface 2718 may be an integrated services digital network (ISDN) card, cable modem, satellite modem, or a modem to provide a data communication connection to a corresponding type of telephone line. As another example, the one or more communication interfaces 2718 may include a local area network (LAN) card to provide a data communication connection to a compatible LAN. As yet another example, the one or more communication interfaces 2718 may include a wireless network interface controller, such as a 802.11-based controller, Bluetooth controller, Long Term Evolution (LTE) modem, and/or other types of wireless interfaces. In any such implementation, communication interface 2718 sends and receives electrical, electromagnetic, or optical signals that carry digital data streams representing various types of information.

Network link 2720 typically provides data communication through one or more networks to other data devices. For example, network link 2720 may provide a connection through local network 2722 to a host computer 2724 or to data equipment operated by a Service Provider 2726. Service Provider 2726, which may for example be an Internet Service Provider (ISP), in turn provides data communication services through a wide area network, such as the world wide packet data communication network now commonly referred to as the "Internet" 2728. Local network 2722 and Internet 2728 both use electrical, electromagnetic or optical signals that carry digital data streams. The signals through the various networks and the signals on network link 2720 and through communication interface 2718, which carry the digital data to and from computer system 2700, are example forms of transmission media.

In an embodiment, computer system 2700 can send messages and receive data, including program code and/or other types of instructions, through the network(s), network link 2720, and communication interface 2718. In the Internet example, a server 2730 might transmit a requested code for an application program through Internet 2728, ISP 2726, local network 2722 and communication interface 2718. The received code may be executed by processor 2704 as it is received, and/or stored in storage device 2710, or other non-volatile storage for later execution. As another example, information received via a network link 2720 may be interpreted and/or processed by a software component of the computer system 2700, such as a web browser, application, or server, which in turn issues instructions based thereon to a processor 2704, possibly via an operating system and/or other intermediate layers of software components.

In an embodiment, some or all of the systems described herein may be or comprise server computer systems, including one or more computer systems 2700 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:

receiving input defining a custom response action to be executed by a network security application in response to a detection of a potential security incident in an information technology (IT) environment, wherein the input specifies a command to be sent to a device or service related to the network security application in response to the detection of the potential security incident in the IT environment, and wherein the input defining the custom response action further comprises a script file that includes code for performing the custom response action;

generating a package containing executable logic for the custom response action;

sending the package to an application programming interface (API) or other component;

receiving a determination that the package conforms to one or more standards for executing actions within the network security application;

based on receiving the determination that the package conforms to one or more standards for executing actions within the network security application, applying the package to an instance of the network security application;

receiving input defining an adaptive response, wherein the input identifies:

a correlation search used to identify notable events from event data stored by a data intake and query system, wherein the data intake and query system includes event data from a plurality of input data sources in the IT environment, and the custom response action to be executed by the network security application in response to the detection of the potential security incident in the IT environment;

executing, by the data intake and query system, the correlation search against the event data stored by the data intake and query system;

identifying a notable event based on executing the correlation search against the event data stored by the data intake and query system; and executing the custom response action based on identifying the notable event, wherein executing the custom response action comprises running the script file.

2. The computer-implemented method of claim 1, wherein the code for performing the custom response action includes code for interacting with an external application.

3. The computer-implemented method of claim 1, wherein the input defining the adaptive response further includes a configuration for parameters of the custom response action.

4. The computer-implemented method of claim 1, wherein the input defining the custom response action is received via an editing panel of a graphical user interface.

5. The computer-implemented method of claim 4, further comprising displaying, via the editing panel of the graphical user interface, output generated based on testing of the custom response action.

6. A non-transitory computer-readable storage medium storing instructions that, when executed by one or more processors, cause performance of operations comprising:

receiving input defining a custom response action to be executed by a network security application in response to a detection of a potential security incident in an information technology (IT) environment, wherein the input specifies a command to be sent to a device or service related to the network security application in response to the detection of the potential security incident in the IT environment, and wherein the input defining the custom response action further comprises a script file that includes code for performing the custom response action;

generating a package containing executable logic for the custom response action;

sending the package to an application programming interface (API) or other component;

receiving a determination that the package conforms to one or more standards for executing actions within the network security application;

based on receiving the determination that the package conforms to one or more standards for executing actions within the network security application, applying the package to an instance of the network security application;

receiving input defining an adaptive response, wherein the input identifies:

a correlation search used to identify notable events from event data stored by a data intake and query system, wherein the data intake and query system includes event data from a plurality of input data sources in the IT environment, and the custom response action to be executed by the network security application in response to the detection of the potential security incident in the IT environment;

executing, by the data intake and query system, the correlation search against the event data stored by the data intake and query system;

identifying a notable event based on executing the correlation search against the event data stored by the data intake and query system; and executing the custom response action based on identifying the notable event, wherein executing the custom response action comprises running the script file.

7. The non-transitory computer-readable storage medium of claim 6, wherein the code for performing the custom response action includes code for interacting with an external application.

8. The non-transitory computer-readable storage medium of claim 6, wherein the input defining the adaptive response further includes a configuration for parameters of the custom response action.

9. The non-transitory computer-readable storage medium of claim 6, wherein the input defining the custom response action is received via an editing panel of a graphical user interface.

10. The non-transitory computer-readable storage medium of claim 9, wherein the instructions comprise further instructions that, when executed by the one or more processors, cause performance of further operations comprising displaying, via the editing panel of the graphical user interface, output generated based on testing of the custom response action.

11. An apparatus, comprising:

one or more processors; and a non-transitory computer-readable storage medium coupled to the one or more processors, the non-transitory computer-readable storage medium storing instructions that, when executed by the one or more processors, cause the apparatus to:

receive input defining a custom response action to be executed by a network security application in response to a detection of a potential security incident in an information technology (IT) environment, wherein the input specifies a command to be sent to a device or service related to the network security application in response to the detection of the potential security incident in the IT environment, and wherein the input defining the custom response action further comprises a script file that includes code for performing the custom response action;

generate a package containing executable logic for the custom response action;

send the package to an application programming interface (API) or other component;

receive a determination that the package conforms to one or more standards for executing actions within the network security application;

based on receiving the determination that the package conforms to one or more standards for executing actions within the network security application, apply the package to an instance of the network security application;

receive input defining an adaptive response, wherein the input identifies:

a correlation search used to identify notable events from event data stored by a data intake and query system, wherein the data intake and query system includes event data from a plurality of input data sources in the IT environment, and the custom response action to be executed by the network security application in response to the detection of the potential security incident in the IT environment;

execute, by the data intake and query system, the correlation search against the event data stored by the data intake and query system;

identify a notable event based on executing the correlation search against the event data stored by the data intake and query system; and execute the custom response action based on identifying the notable event, wherein executing the custom response action comprises running the script file.

12. The apparatus of claim 11, wherein the code for performing the custom response action includes code for interacting with an external application.

13. The apparatus of claim 11, wherein the input defining the adaptive response further includes a configuration for parameters of the custom response action.

14. The apparatus of claim 11, wherein the input defining the custom response action is received via an editing panel of a graphical user interface.

15. The apparatus of claim 14, wherein the instructions comprise further instructions that, when executed by the one or more processors, cause performance of further operations comprising displaying, via the editing panel of the graphical user interface, output generated based on testing of the custom response action.

* * * * *